Dec. 31, 1935. D. O. ROYSTER ET AL 2,026,101
LETTER PRINTING MACHINE
Filed July 17, 1930 17 Sheets-Sheet 2
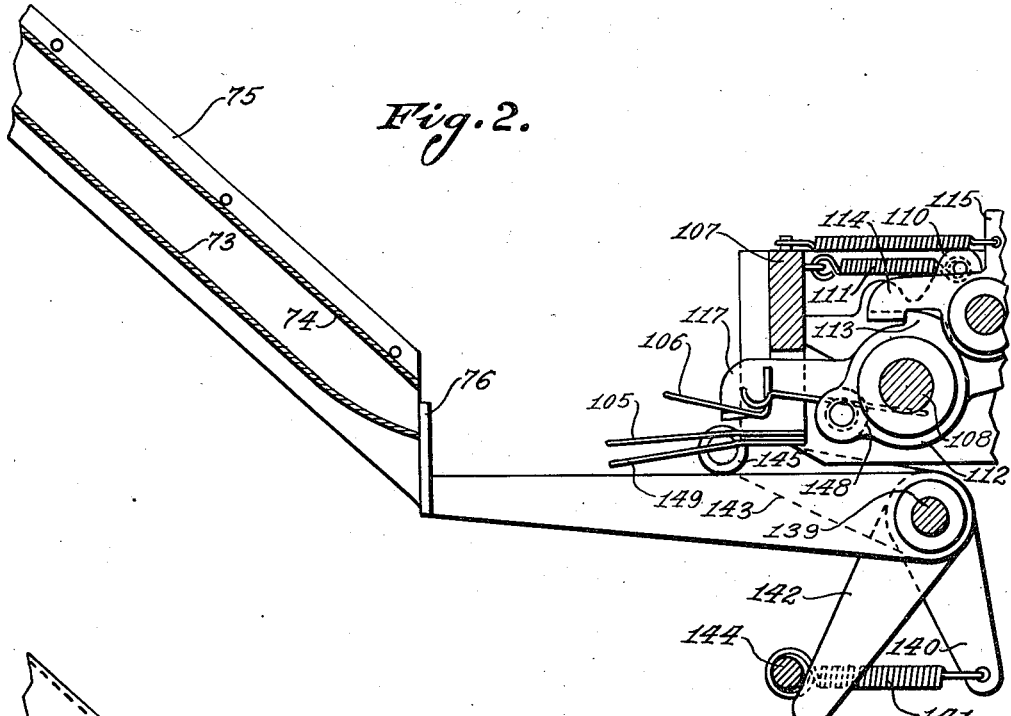
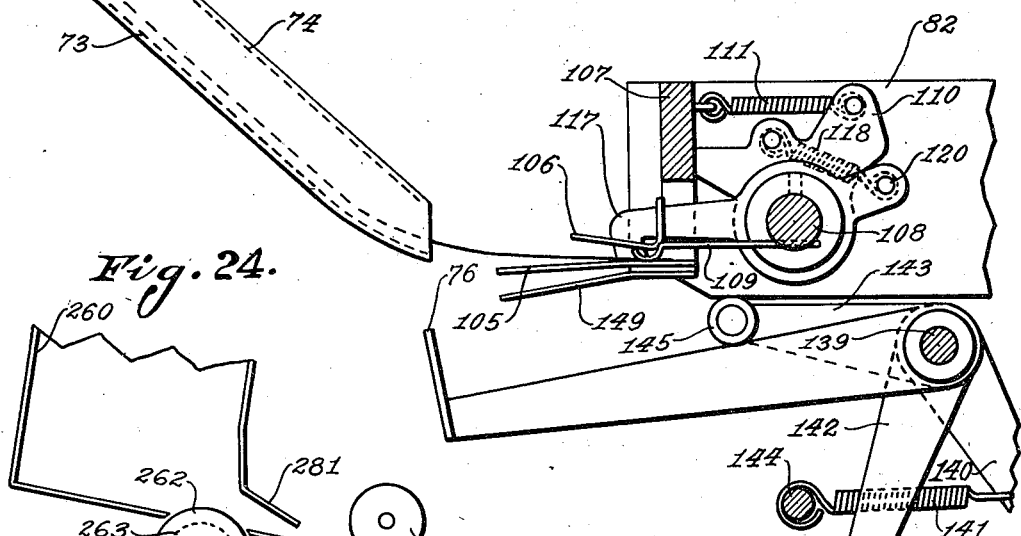
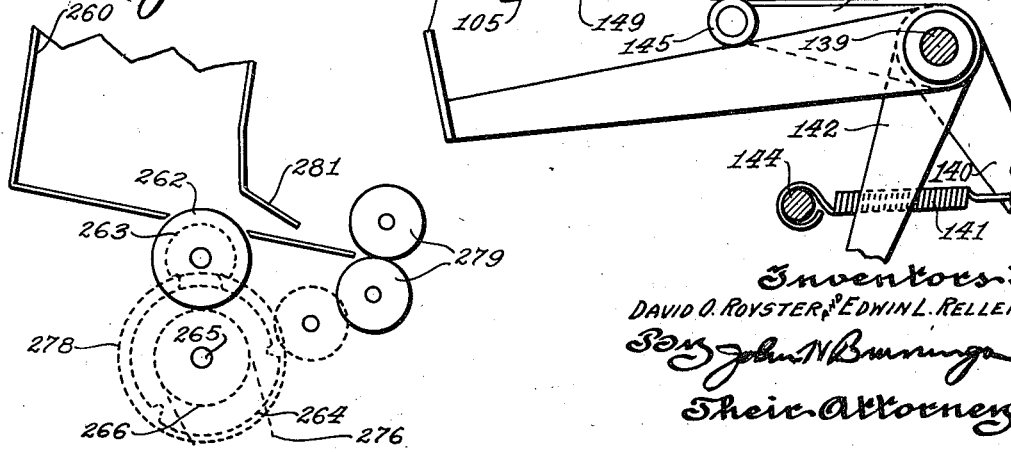
Inventors:
DAVID O. ROYSTER & EDWIN L. RELLER,
By John N Bunninga
Their Attorney.

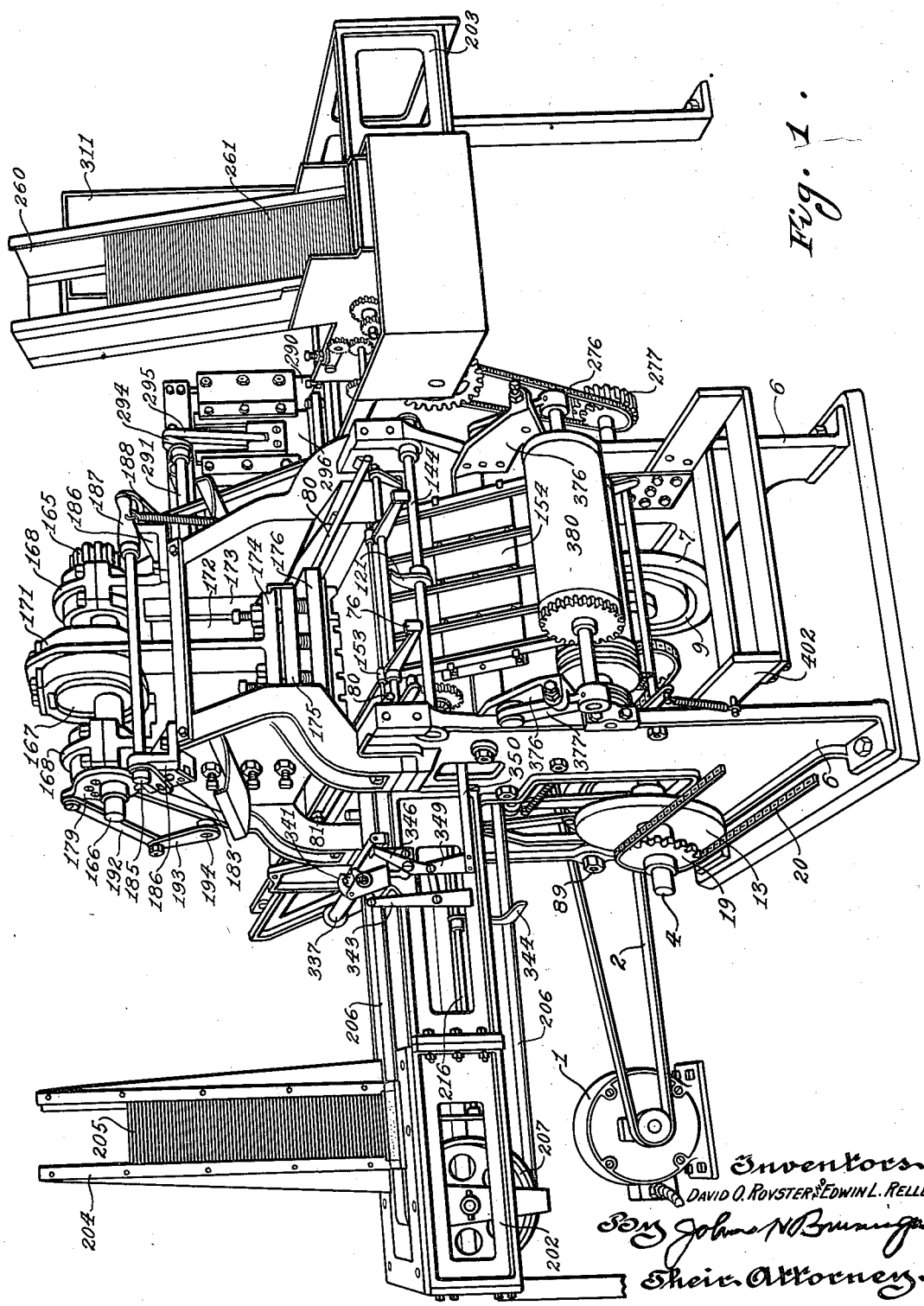

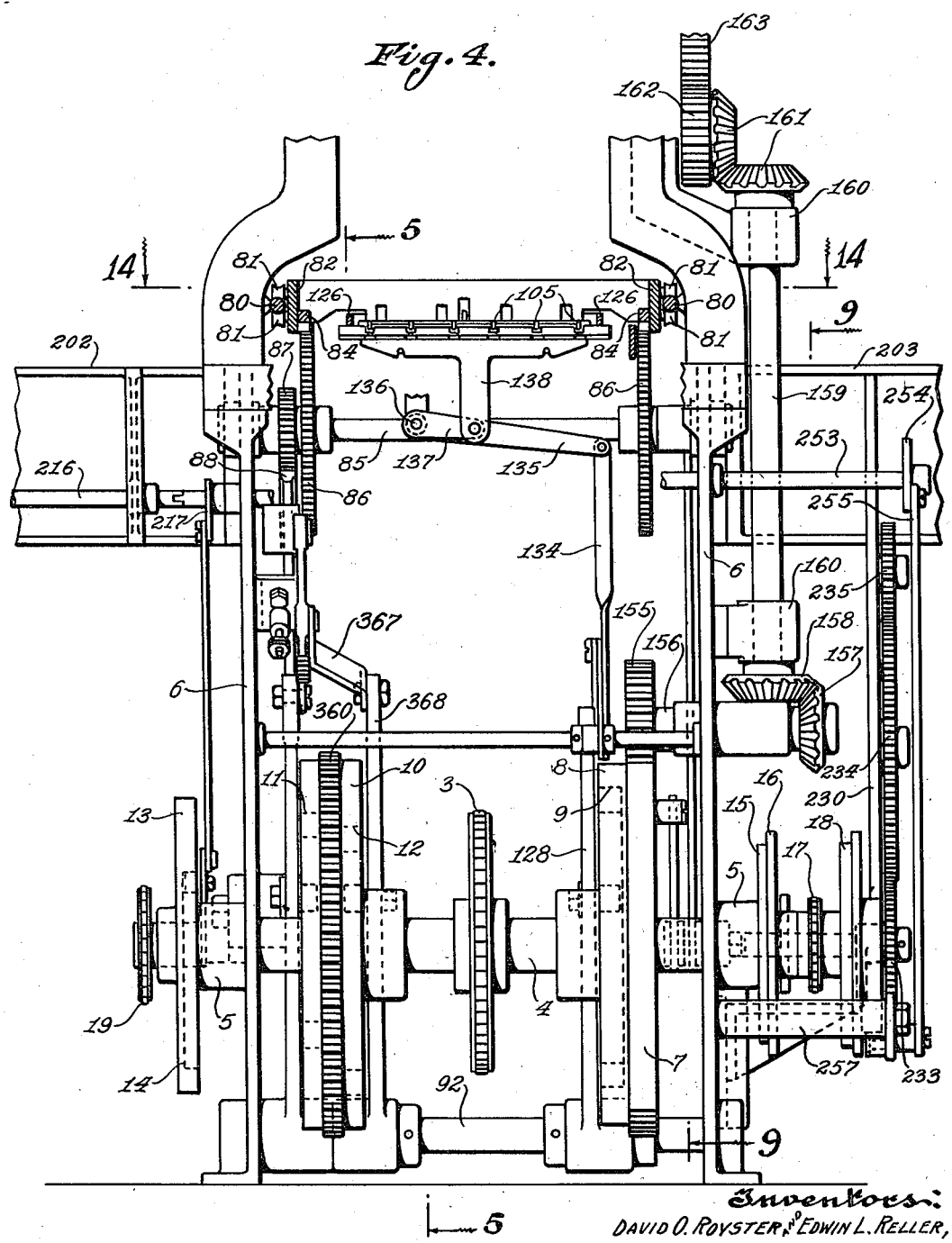

Dec. 31, 1935.　　D. O. ROYSTER ET AL　　2,026,101
LETTER PRINTING MACHINE
Filed July 17, 1930　　17 Sheets-Sheet 4
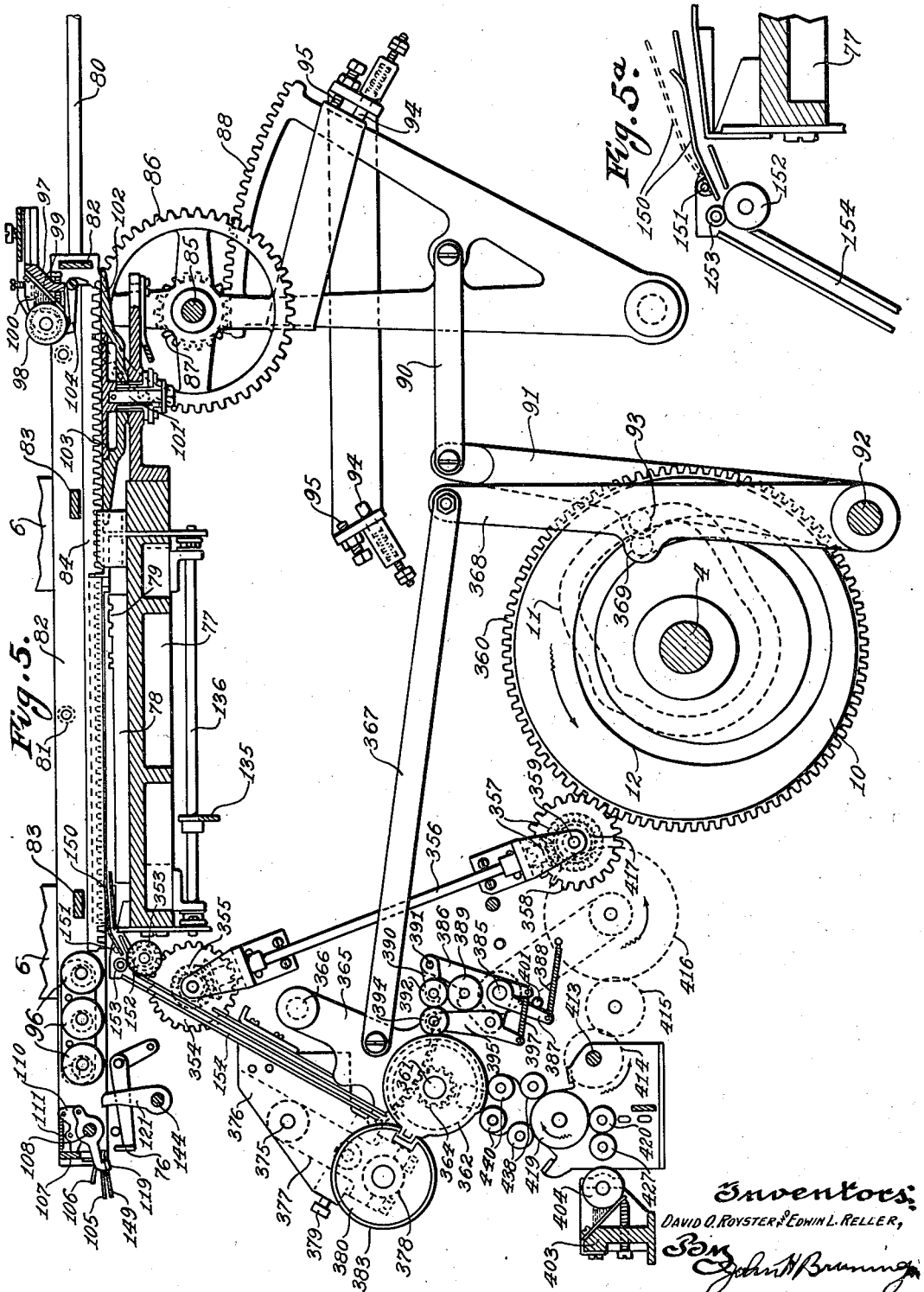

Dec. 31, 1935.  D. O. ROYSTER ET AL  2,026,101
LETTER PRINTING MACHINE
Filed July 17, 1930   17 Sheets-Sheet 5
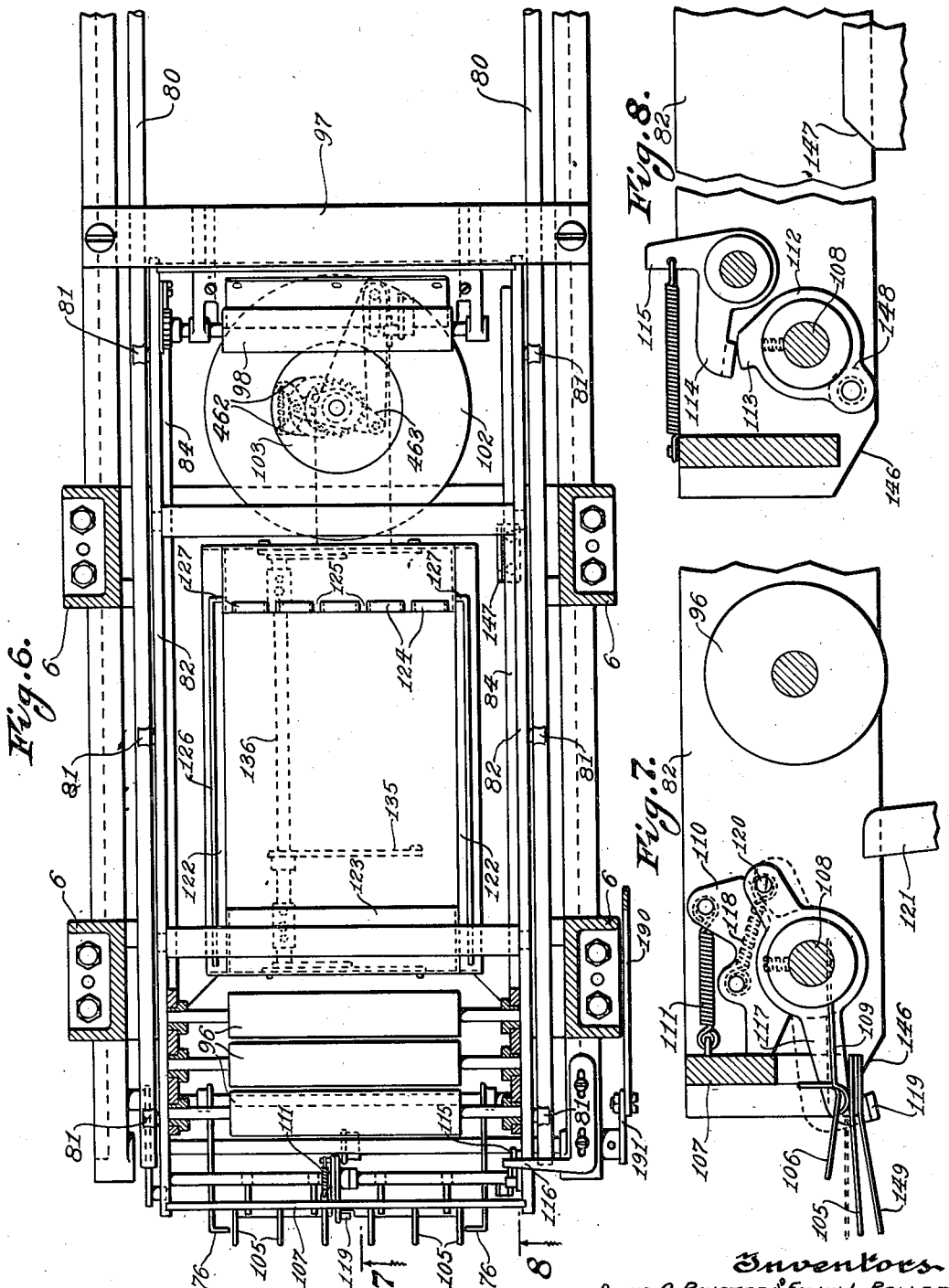

Dec. 31, 1935.  D. O. ROYSTER ET AL  2,026,101
LETTER PRINTING MACHINE
Filed July 17, 1930  17 Sheets-Sheet 6

Inventors:
DAVID O. ROYSTER, and EDWIN L. RELLER,
By John N. Brunings
Their Attorney.

Dec. 31, 1935.    D. O. ROYSTER ET AL    2,026,101
LETTER PRINTING MACHINE
Filed July 17, 1930    17 Sheets-Sheet 7

Inventors:
DAVID O. ROYSTER, EDWIN L. RELLER,
John W. Brunniga
Their Attorney.

Dec. 31, 1935.                D. O. ROYSTER ET AL                2,026,101
                              LETTER PRINTING MACHINE
                    Filed July 17, 1930          17 Sheets-Sheet 8
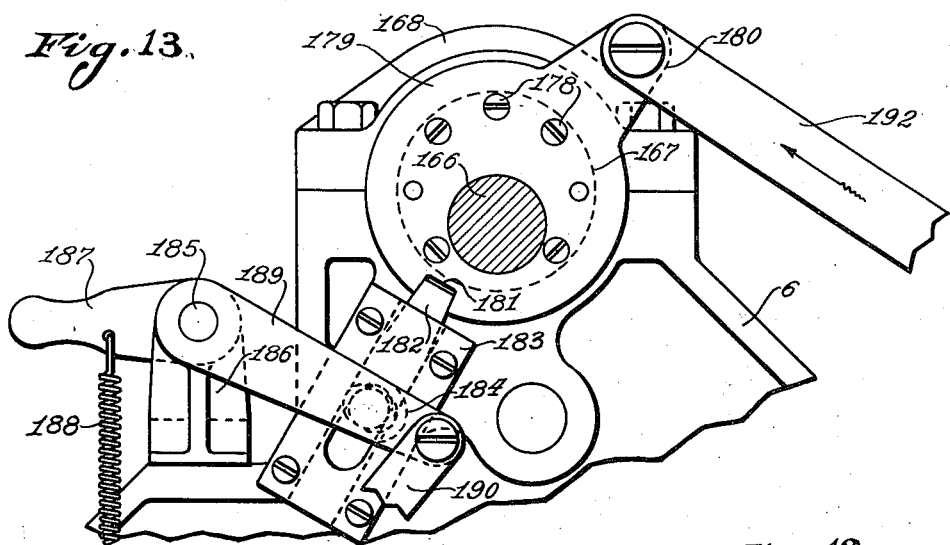
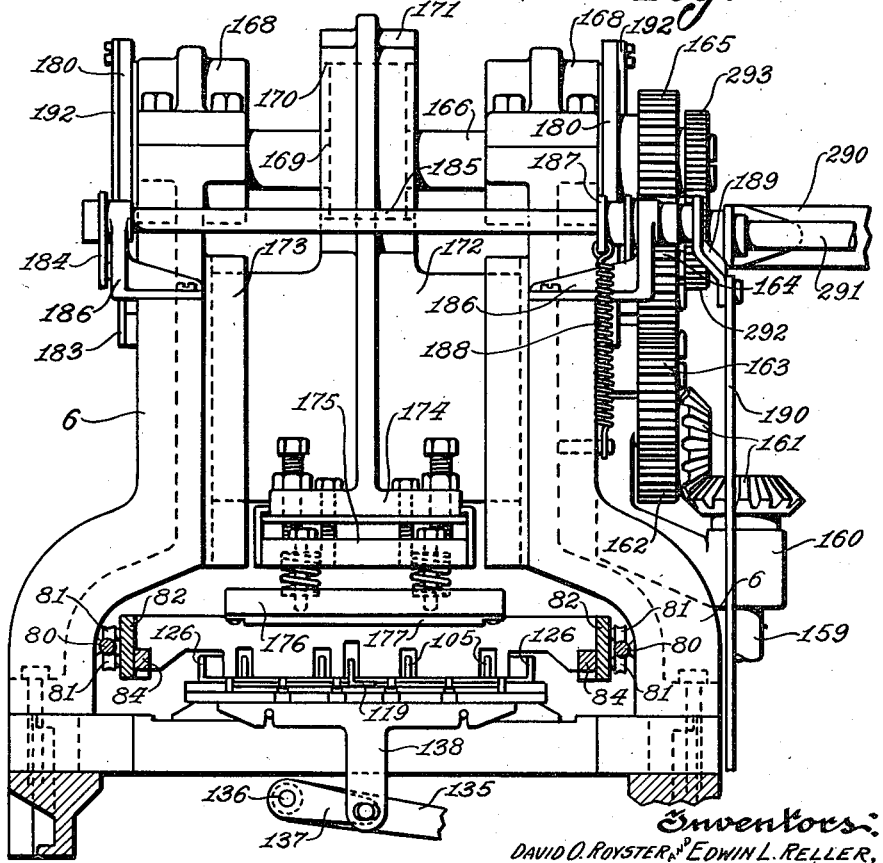
Inventors:
DAVID O. ROYSTER AND EDWIN L. RELLER,
Their Attorney Dec. 31, 1935.  D. O. ROYSTER ET AL  2,026,101
LETTER PRINTING MACHINE
Filed July 17, 1930   17 Sheets-Sheet 9
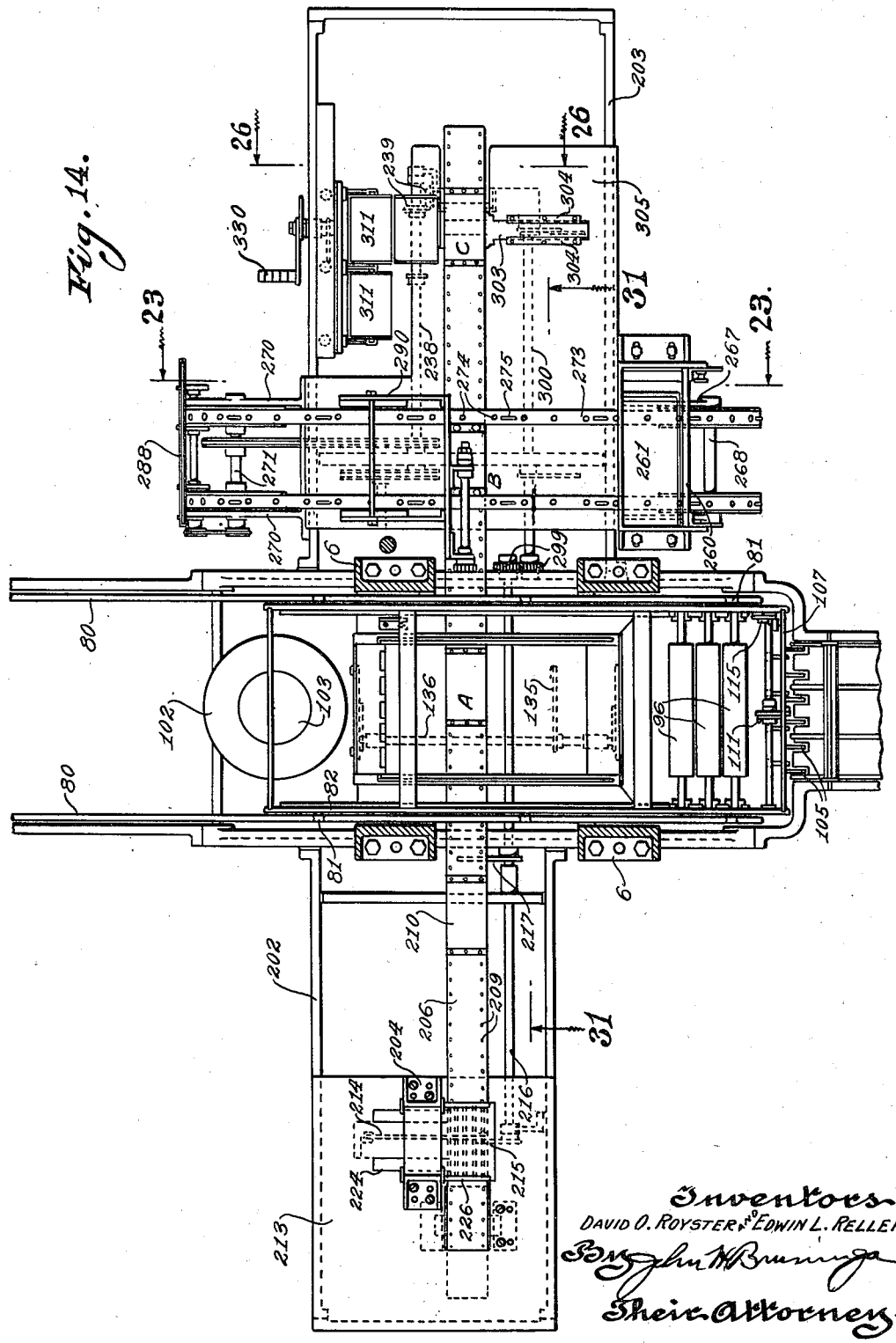

Dec. 31, 1935.  D. O. ROYSTER ET AL  2,026,101
LETTER PRINTING MACHINE
Filed July 17, 1930  17 Sheets-Sheet 10
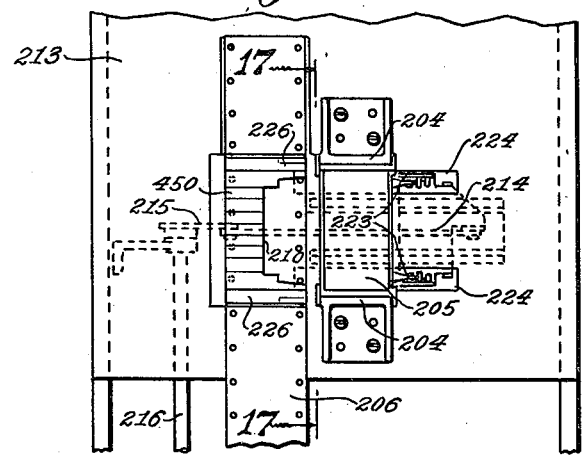
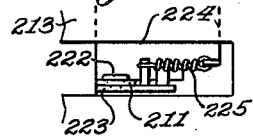
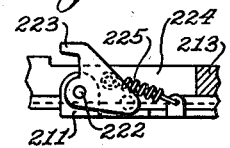
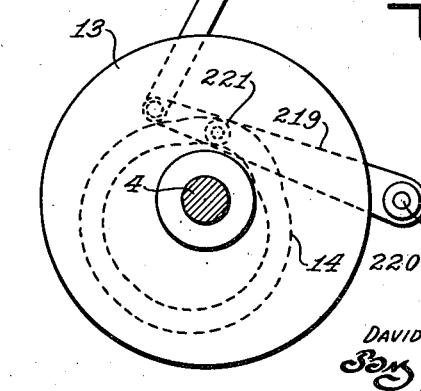
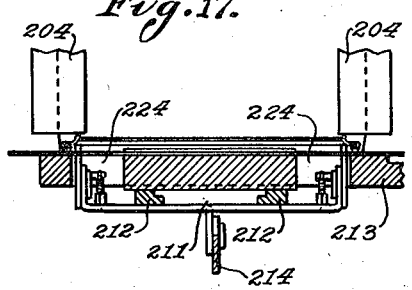

Dec. 31, 1935. D. O. ROYSTER ET AL 2,026,101
LETTER PRINTING MACHINE
Filed July 17, 1930 17 Sheets-Sheet 11
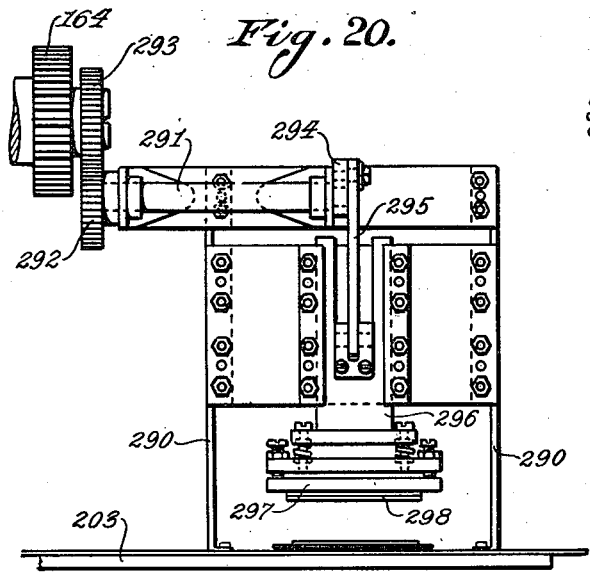
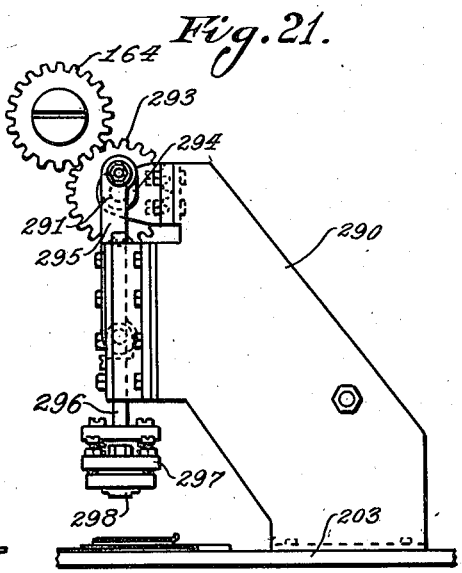
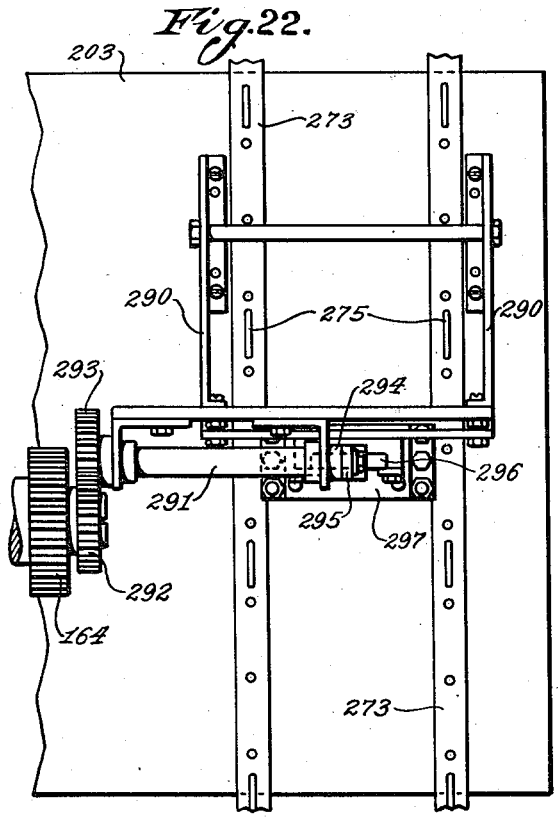
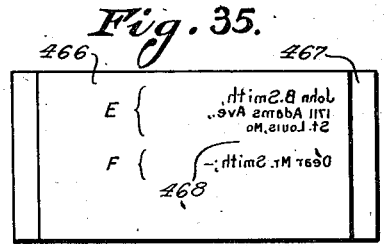
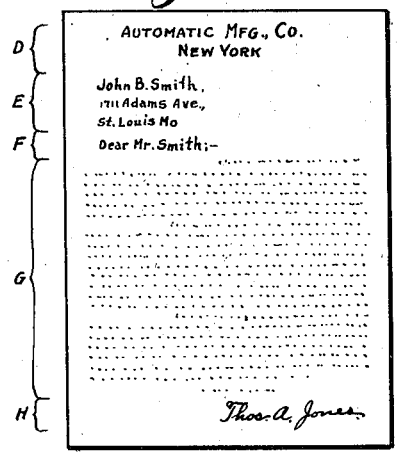
Inventors:
DAVID O. ROYSTER & EDWIN L. RELLER,
Their Attorney.

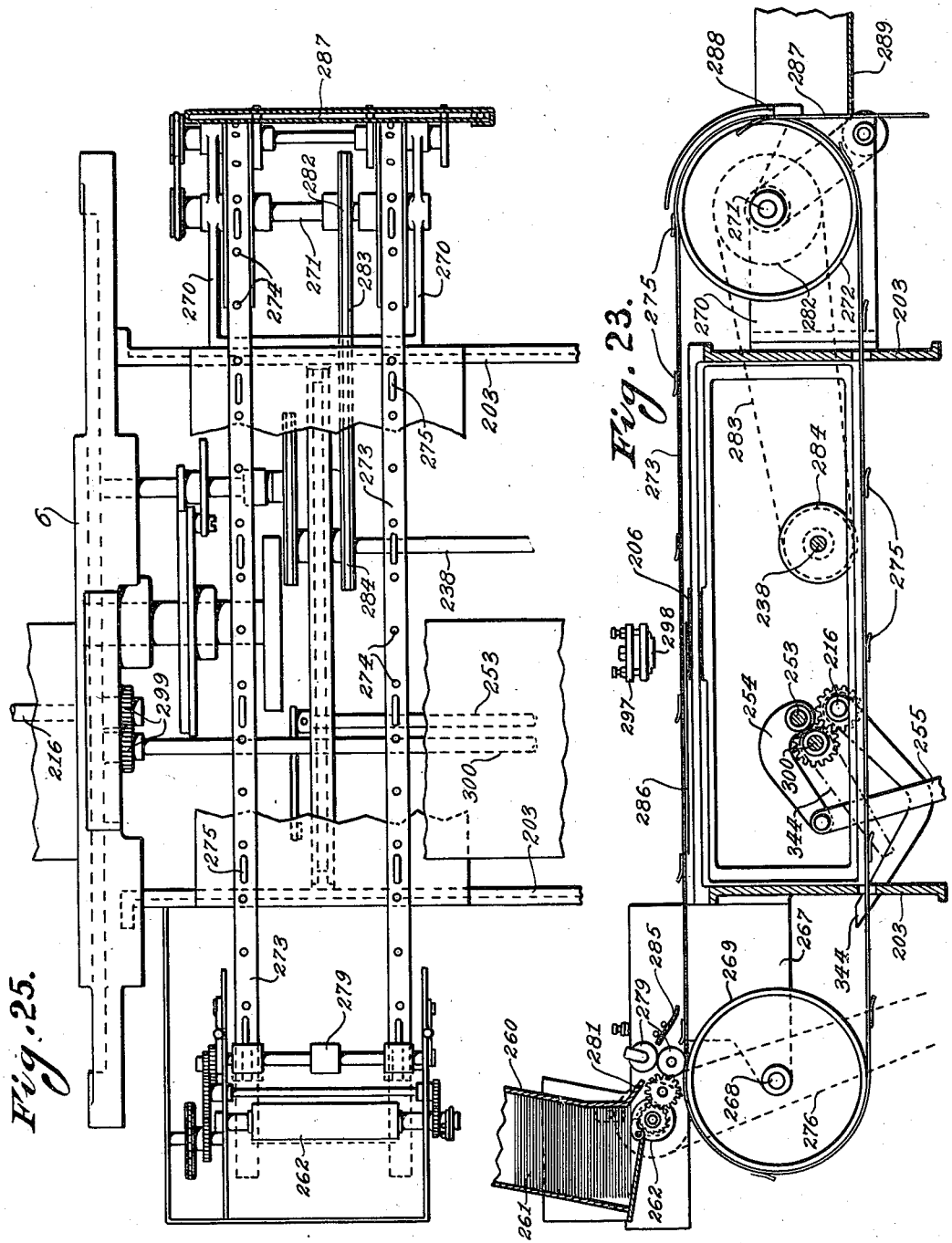

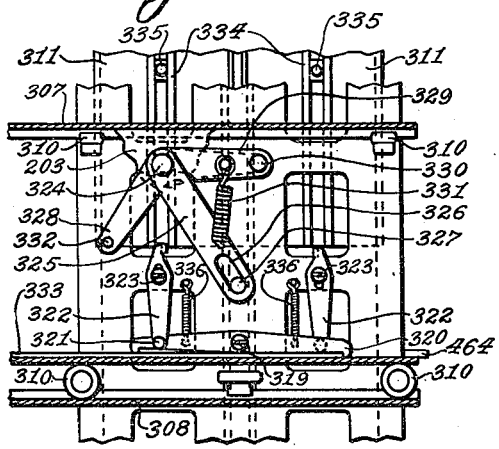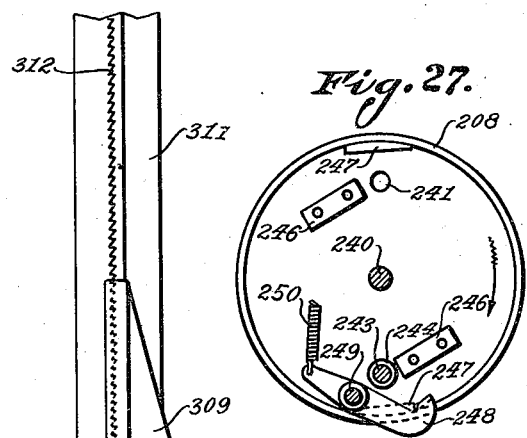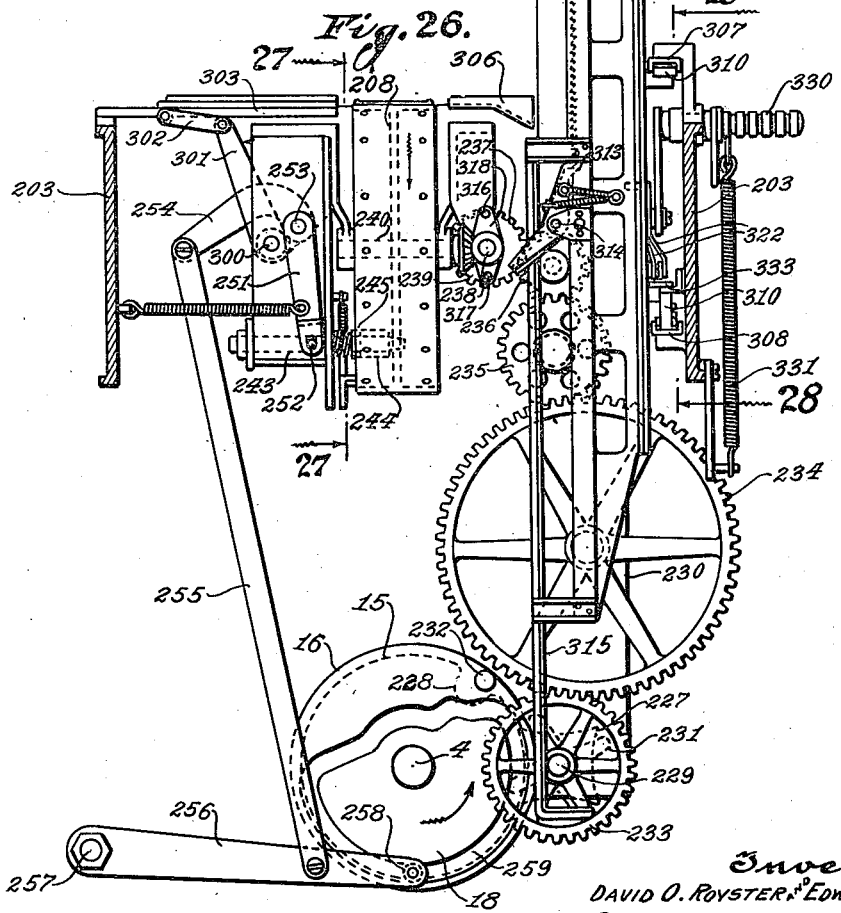

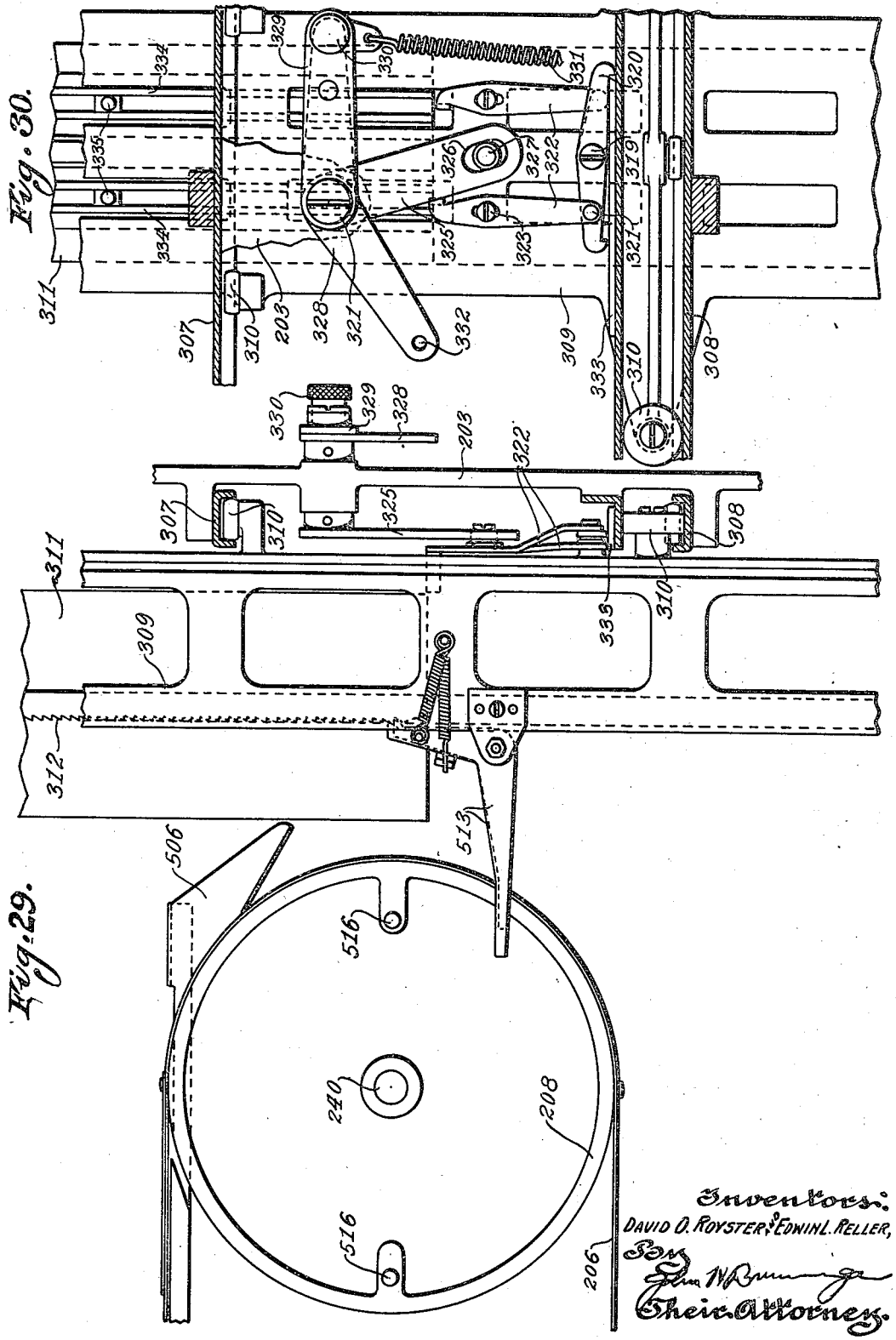

Dec. 31, 1935.  D. O. ROYSTER ET AL  2,026,101

LETTER PRINTING MACHINE

Filed July 17, 1930  17 Sheets-Sheet 15

Inventors:
DAVID O. ROYSTER, and EDWIN L. RELLER,
John H. Bruninga
Their Attorney.

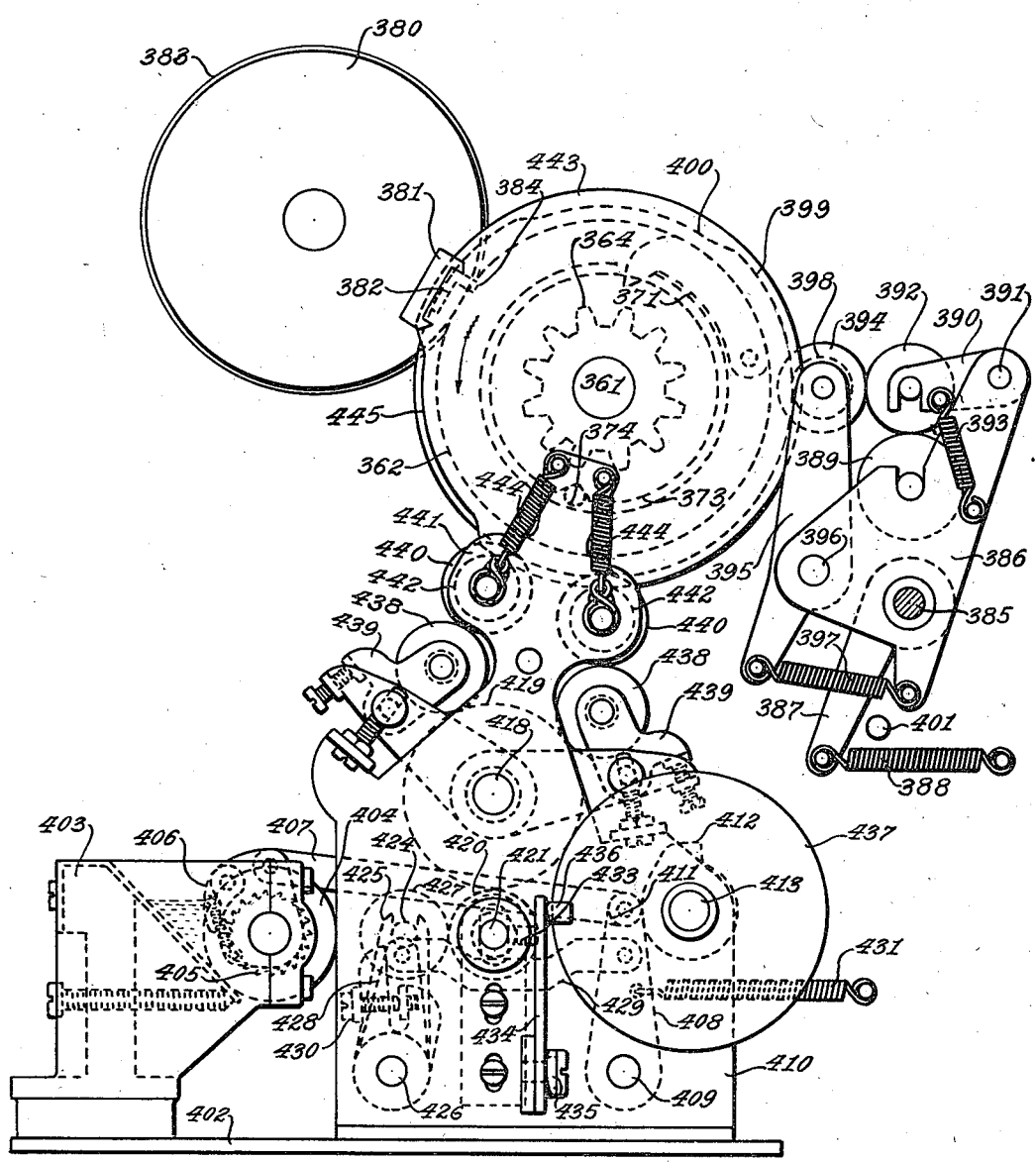

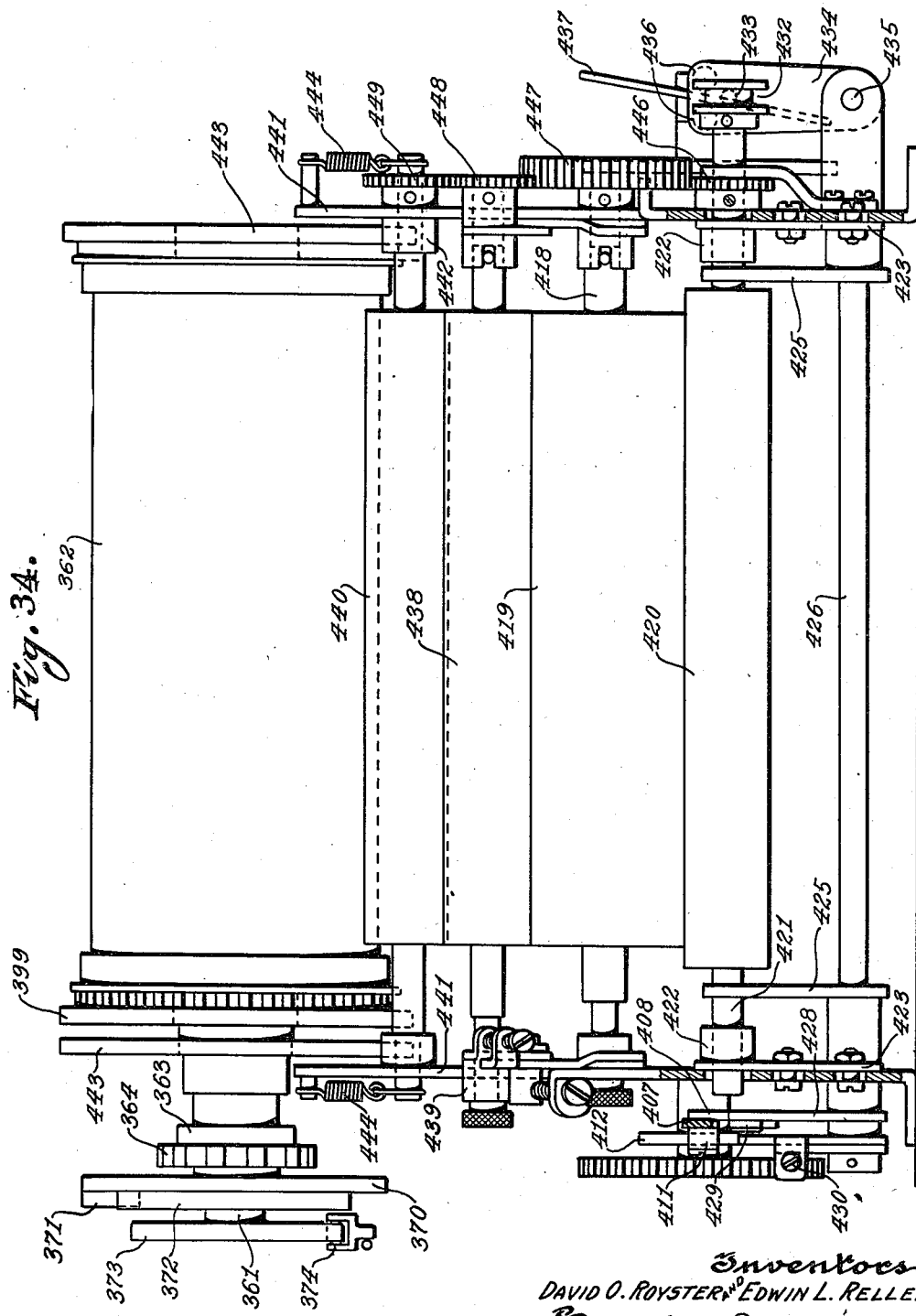

Patented Dec. 31, 1935

2,026,101

UNITED STATES PATENT OFFICE 2,026,101

LETTER PRINTING MACHINE

David O. Royster, Overland, and Edwin L. Reller, St. Louis, Mo., assignors to American Mail-O-Press Corporation, St. Louis, Mo., a corporation of Missouri Application July 17, 1930, Serial No. 468,618

18 Claims. (Cl. 101—57)

This invention pertains to printing machines and more particularly to letter printing machines such as are used for printing circular letters, each letter being addressed to a particular addressee.

One of the objects of this invention is to provide a machine for printing addressed circular letters and a series of correspondingly addressed envelopes which will be entirely automatic in its operation.

Another object is to provide a machine which will print circular letters in large quantities each letter being addressed to a particular addressee which address is printed in a uniform manner with the body of the letter, the letter head and the signature of the sender being also printed on the sheet by the machine.

Another object is to provide a machine of the character described in which the salutation, in connection with the address, etc., is also printed on the letter.

Another object is to provide a machine as just described whereby the letter head, the body of the letter and the signature of the sender may be printed in different inks.

Another object is to provide a machine adapted for printing circular letters from a type bed in which the body of the letter is set up together with a series of addressed plates which are successively positioned in proper relation with the letter body and means for printing the letter head and the signature together with means for feeding sheets to the printing mechanism and for automatically printing thereon in succession the body of the letter with its address and the letter head and signature.

Another object is to provide novel means for handling the letter sheet as it passes through the machine to receive the successive impressions.

Another object is to provide novel means for restraining the action of the machine in case a sheet should fail to feed.

Another object is to provide means for making ready the body printing form as employed in connection with a ribbon and also a series of address plates.

Another object is to provide novel means for handling a series of address plates passing through the machine in succession to be printed in cooperation with the letter body and also for addressing the envelopes and for properly removing and storing the plates after the printing thereof.

Another object is to provide novel means for feeding and printing envelopes to correspond with the printed letters.

Another object is to provide novel means for separately inking the printing means for the letter body, the letter head and the signature.

Further objects will appear from the following description taken in connection with the accompanying drawings; in which:

Figure 1 is a perspective view taken from the left front of a machine embodying this invention;

Figures 2 and 3 are vertical longitudinal sections of the chute leading to the carriage; with sheet grippers in different positions;

Figure 4 is a front view of the lower portion of the main frame of the machine with parts removed so as to show the driving mechanism;

Figure 5 is a view in longitudinal section taken about on the line 5—5 of Figure 4 of the machine showing the mechanism for driving the carriage and the inking devices;

Figure 5a is an enlarged detail of the same;

Figure 6 is a plan view of the carriage. This may also be taken as a plan view of Figure 5 with parts omitted in order to avoid confusion;

Figure 7 is a detail section on line 7—7 of Figure 6;

Figure 8 is a detail section on line 8—8 of Figure 6;

Figure 12 is a front view of Figure 10;

Figure 13 is an enlarged detail of Figure 10;

Figure 14 is a horizontal section taken about on line 14—14 of Figure 4;

Figure 15 is a detail of the mechanism for placing the addresss plates upon the tranvserse belt;

Figure 16 is a plan view of Figure 15;

Figure 17 is an enlarged section taken on line 17—17 of Figure 16;

Figure 18 is an enlarged detail of Figure 15;

Figure 19 is an enlarged detail of Figure 16;

Figure 20 is a front view of the envelope printing platen and its operating mechanism;

Figure 21 is a right-hand side view of Figure 20;

Figure 22 is a plan view of Figure 20;

Figure 23 is an enlarged sectional view taken about on line 23—23 of Figure 14;

Figure 24 is an enlarged detail of Figure 23;

Figure 25 is a plan view of Figure 23 with parts omitted;

Figure 26 is a vertical sectional view taken about on line 26—26 of Figure 14 showings the mechanism for accurately locating the address plate and also the mechanism for discharging such plates into the storage receiver;

Figure 27 is a detail section on line 27—27 of Figure 26;

Figure 28 is a detail section on line 28—28 of Figure 26;

Figure 29 is a view taken in about the same way as Figure 23 but showing a construction adaptable for the use of a different kind of address plate;

Figure 30 is a rear view of Figure 29 (taken from the right-hand side of said figure);

Figure 33 is an enlarged detail of Figure 5 showing the devices for inking the letterhead and signature printing cylinder and the mechanism for controlling the same;

Figure 34 is a front elevation of Figure 33 omitting the ink fountain;

Figure 35 is a face view of an address plate as used in this machine; and

Figure 36 is a view of one form in which the circular letter may be printed on this machine.

The general outline of operation

Figure 9:
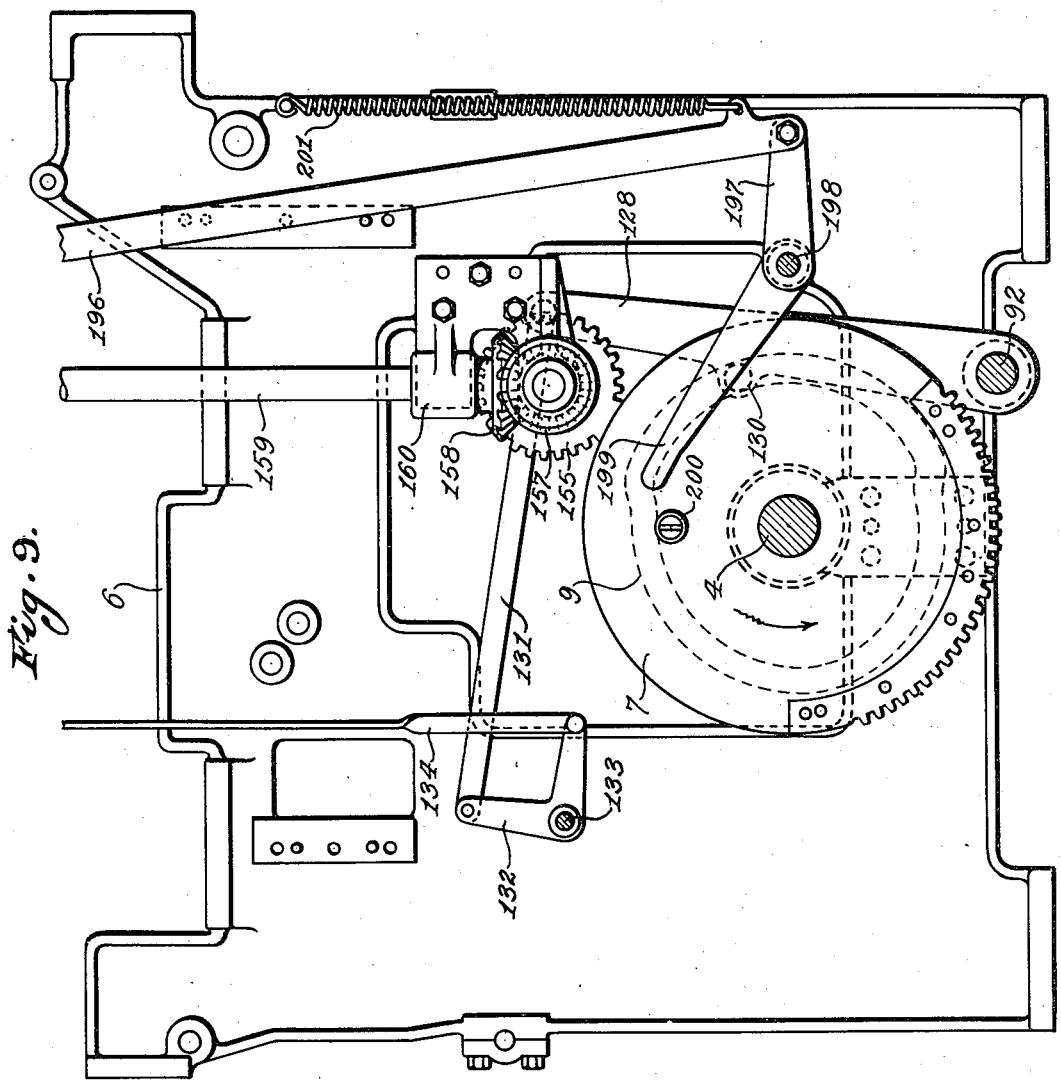
Figure 9 is a detail section taken about on line 9—9 of Figure 4 illustrating the connections for driving the platen and the stripper.
Figure 11:
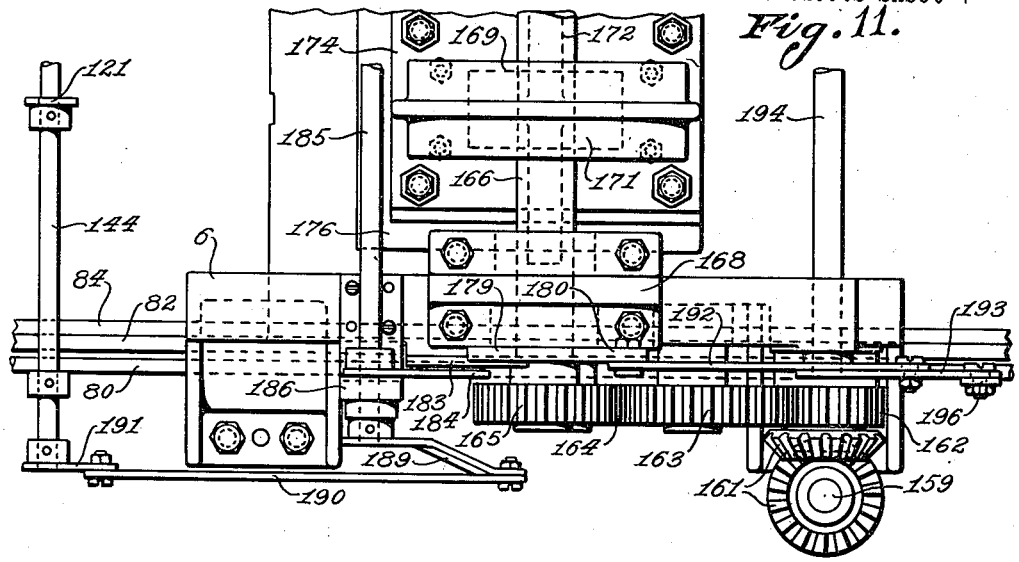
Figure 11 is a partial plan view of Figure 10.
Figure 10:
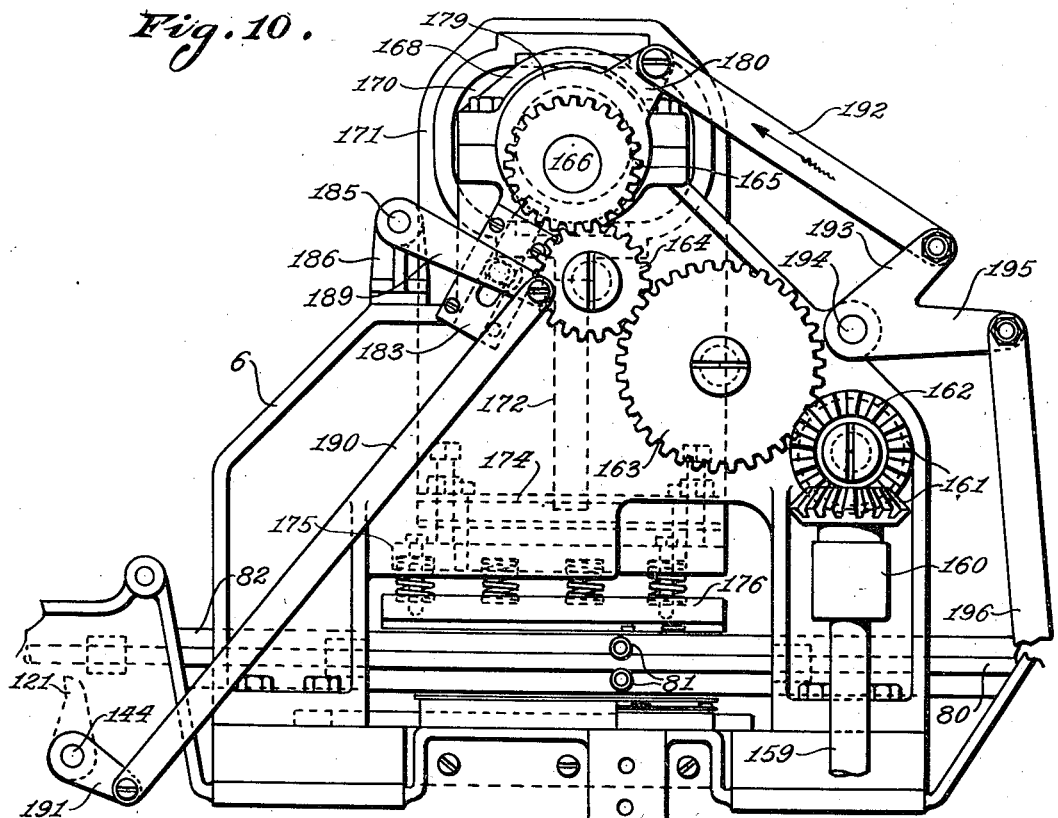
Figure 10 is a view from the right-hand side of the machine showing the mechanism for operating the platen. This mechanism is positioned above that shown in Figure 4.

In the operation of this machine a blank sheet is fed to a position to be received by a moving carriage which carries it to printing position over an ink ribbon below which is positioned a type chase in which the body of the letter has been set up in ordinary type. An address plate containing the name, address and salutation of the party to whom the letter is to be sent has previously been properly positioned relatively to the body of the letter below the ink ribbon. A printing platen is now brought down upon the sheet so as to press the same against the type with the ribbon therebetween. This prints the address and body of the letter on the sheet. The platen is now raised and the carriage reverses its movement and carries the sheet from its printing position and delivers it to a chute in the front of the machine. At the same time the address plate is moved laterally to a new printing position under the ribbon, while a new address plate is moved into position for printing with the body of the letter.

While the foregoing operations were going on, a series of envelopes have been fed from a supply stack and carried successively to the new printing position of the address plate which has just been printed with the letter. As the platen descends to print the letter, as previously described, an auxiliary platen is brought down upon an envelope positioned over the address plate which has just been shifted from the body of the letter. It will be noted, therefore, that an addressed envelope is provided for each addressed letter. The address plates are carried by a transverse belt and are automatically placed upon this belt at one side of the machine and after printing are automatically removed therefrom to a storage receiver.

The printed letter which has been delivered to the chute in front of the machine is carried thereby between a printing cylinder and a pressure roll. The printing cylinder is provided with type plates bearing a letterhead which is to be printed on the letter sheet, and the signature of the sender. Two inking devices are provided; one of which is automatically controlled so as to ink only the letterhead on the printing cylinder. The other inking device is automatically controlled so as to ink only the signature plate. These two inking devices may be, and usually are, supplied with ink of different colors. Accordingly, a letterhead may be printed in one color and the signature in another, and both of these colors may be different from that of the body of the letter. At an appropriate time in the operation of the machine, this printing cylinder is rotated together with its pressure roll and the letter sheet is thereby passed between these cylinders and the letterhead and signature are printed thereon.

Main driving mechanism

Referring to the drawings, more particularly Figs. 1 and 4, I designates an electric motor or prime mover of any suitable type for driving the machine. From the motor 1 a belt 2 transmits power to a speed reducing mechanism of any suitable type. (Not shown). This speed reducing mechanism in turn transmits power by means of a chain or other suitable connection (not shown) to a sprocket 3 on a main drive shaft 4, shown in Figure 4. The shaft 4 is journaled in bearings 5 in a frame 6 upon which the entire mechanism is mounted. Mounted on the shaft 4 is a mutilated gear 7 which drives the letter printing platen. Carried by the gear 7 is a disc 8 provided in its face with a cam slot 9 by means of which the mechanism for operating the stripper is driven. The shaft 4 also carries a disc 10 in one face of which is a cam slot 11 which drives the mechanism for operating the carriage. The opposite face of the disc 10 is provided with a cam slot 12 which drives the mechanism for operating the letterhead and signature printing cylinder. On the left-hand end of the shaft 4 is mounted a disc 13 which has provided in the face thereof a cam slot 14 which drives the mechanism for inserting and discharging the address plates and also for winding and rewinding the ink ribbon. On the right-hand end of the shaft 4 are mounted two plates 15 and 16 which together constitute a Geneva gear, as will be more fully described hereinafter, which drives the transverse belt which carries the address plates. This mechanism also drives the belt which carries the envelopes successively to printing position. A sprocket 17 also carried by the shaft 4 is mounted to drive mechanism for feeding envelopes from the supply stack to the belt which carries them to printing position. A disc 18 on the shaft 4 operates connections which control the accurate centering of the address plates in their several printing positions.

Carriage mechanism

Referring now more particularly to Figures 5 to 8, inclusive, mounted in any suitable manner upon a bed 77 on the frame 6 is a chase 78 of any suitable type in which the body of the letter is set up. This chase may be provided at one end thereof with an elevated portion 79 adapted to provide a support for the address plate, as will be more fully described hereinafter. Mounted in any suitable manner in the frame 6 is a pair of longitudinally extending rods or rails 80. Mounted to run on rollers 81 on the rails 80 is a carriage 82. The carriage 82 comprises simply a rectangular frame having side and end members and braced by cross members 83. Extending along the lower edge of each side of the frame 82 is a toothed rack 84.

Mounted on a transverse shaft 85 in the frame 6 is a pair of gears 86 adapted to engage the rack 84 to move the carriage. The shaft 85 has secured thereto a pinion 87 engaging a toothed sector 88 pivoted on a stud 89 on the frame 6. The sector 88 is connected by a link 90 with a lever 91 pivoted on a cross shaft 92 in the lower part of the frame 6. The lever 91 carries a cam roll 93 engaging the cam slot 11 in the disc 10 on the main drive shaft 4. Operation of the cam 11 will cause the lever 91 to swing forward and back, thereby rocking the sector 88. This sector operates the pinion 87 to turn the shaft 85 thereby rotating the gears 86 which co-operate with the racks 84 to move the carriage back and forth. In order to stop the sector 88 at each end of its travel, stop devices, as shown in Figure 5 are provided. These consist simply of a spring bumper 94 which serves to absorb the momentum of the sector and the carriage and an adjustable positive stop 95 which limits the movement of the sector. The cam groove 11 is so formed as to cause this mechanism to move the carriage back and forth in timed relation with the other mechanism of the machine and may be shaped to provide such acceleration, retardation or pauses as will regulate the movement of the paper in any desired manner. This movement will be more fully described hereinafter.

In order to ink the type in the chase 78 inking devices may be provided on the carriage 82 instead of an ink ribbon. This may take the form of a series of inking rolls 96 suitably journaled near the front end of the carriage. Mounted on the rear of the frame 6 and ink fountain 97 may be provided. This may be of any suitable type. As illustrated, it comprises a steel roll 98 engaging an adjustable plate 99 holding therebetween a pool of ink 100. Mounted on a pivot 101 on a bracket 129 on the bed 77 an ink table 102 may be provided. As illustrated in the drawings, this may be of the type having a separate center section 103, as shown in Figures 5 and 6 and suitable devices such as oppositely-acting pawls 462 on an arm 463 which is swung in opposite directions by the reciprocating movement of the carriage, may be provided for rotating the sections 102 and 103 in opposite directions in order to spread the ink. This mechanism is old in the art and no detail description thereof is necessary. At each movement of the carriage back and forth the rolls 96, which may be of composition such as is ordinarily used for ink rollers of this type, are carried across the inking table back and forward and the ink table is turned so that the ink is spread evenly thereover. At each rearward movement the rear roll 96 comes in contact with the roll 98 to take ink therefrom. At each forward movement of the carriage a pawl 104 thereon strikes a ratchet carried by the roll 98 and operates to turn said roll so as to feed the ink.

It will be noted from Figure 1 that the front of the machine opposite the sheet printing devices is open so that a suitable mechanism for feeding the sheets individually may be placed in cooperation with the machine at this point. There are many types of sheet feeding devices which are well known in the art, a detailed description of which is unnecessary for the purpose of this invention. It is contemplated, however, that some such feeding mechanism be placed in cooperation with the machine at this point in such a manner that the sheets as they are fed therefrom may be received by the sheet handling devices on the carriage 82 as will now be described.

Such sheet feeding means is represented in the drawings by the chute 75 which forms the delivery end thereof.

The carriage 82 is provided at its forward end with devices for gripping the paper sheet as it is received from the feeder. This is shown in section in Figure 7. A lower guide 105 and an upper guide 106 are permanently mounted on the front cross member 107 of the carriage. The guides 105 and 106 are flared in a vertical direction so as to insure that the edge of the sheet will be received therebetween. Mounted on a shaft 108, journaled in the side members of the carriage 82 is a series of fingers 109. These extend forwardly through slots in the cross members 107. The fingers 109 are positioned so that when moved downwardly they will engage the upper surface of the guides 105. Fixed to the shaft 108 is an arm 110 tensioned by a spring 111 so as to rock the shaft forwardly to depress the fingers 109. Also fixed to the shaft 108 (see Figure 8) is a plate 112 provided with a dog 113 adapted to be engaged by a spring latch 114 to hold the shaft 108 against the tension of the spring 111 and to maintain the fingers 109 in raised position. The latch 114 has an upwardly extending dog 115 adapted to be engaged by an adjustable arm 116 on the frame 6 so that at a proper point in the travel of the carriage the latch 114 will be released so as to permit the fingers 109 to descend and grip the paper which has at that time been positioned between said fingers and the guide 105.

In order to insure non-printing in case a sheet should fail to feed and be properly gripped by the carriage, an arm 117 is pivoted on the shaft 108 and tensioned by a spring 118. The arm 117 carries a finger 119 which is so positioned relatively to the guides 105 and 106 and the fingers 109 so that when a sheet of paper is normally positioned to be engaged by the fingers 109, said finger 119 when moved downwardly will engage the sheet so positioned. The arm 117 is provided with a rearward extension having a pin 120 adapted to engage the rear edge of the arm 110 so as to hold the finger 119 in raised position while the fingers 109 are retracted and latched by the engagement of the latch 114 with the dog 113. When the shaft 108 is released by the arm 116 engaging the dog 115, the finger 119 is moved downwardly into engagement with the sheet if the same is in position. If no sheet is in position on the guides 105 the finger 119 moves downwardly beyond said guides to a position such that when the carriage 82 moves rearwardly said finger 119 will engage an arm 121 connected to control the movement of the platen, as will be more fully described hereinafter.

A stripper is provided to separate the sheet from the type or the ribbon. This is shown in Figure 6, and comprises a frame having side members 122 adapted to engage the side margins of the sheet and end members 123 and 124 adapted to engage the end margins, the latter members at the rear end of the stripper being sectionalized to provide gaps 125 through which the guides 105 and 106 may pass as the carriage moves back and forth. The stripper is provided with an upstanding rim 126 at each side adapted to center the sheet relatively to the type and this upstanding rim is bent inwardly at the rear end, as shown at 127, to form a stop, adapted to position the paper endwise for printing.

When the carriage moves rearwardly after having picked up a sheet of paper it carries the same over the stripper and deposits it thereupon between the rims 126 and against the stops 127.

After printing the sheet and as the platen rises the stripper is elevated therewith. In order to accomplish this stripper movement, a lever 128 is pivoted on the shaft 92 on the frame 6 and carries a cam roll 130 engaging the cam slot 9. (See Figure 9.) The upper end of the lever 128 is connected by a link 131 to a bell crank 132 pivoted at 133 on the frame 6. The bell crank 132 operates a link 134 whose upper end is connected to a lever 135. The lever 135 is fixed to a shaft 136 having an arm 137 which is pivoted at its outer end to a vertically movable bracket 138 which carries the stripper. (See Figures 4 and 6.) As shown in Figure 6, the shaft 136 extends longitudinally of the machine and there is a bracket 138 and an arm 137 at each end thereof so as to engage both ends of the stripper.

In the operation of this carriage mechanism a sheet of paper is passed down between the guides 73 and 74 and is stopped by the stops 76. The carriage then moves forwardly to a position, as shown in Figs. 2 and 3. In this position the fingers 109 are elevated as is also the arm 117 so that the gripping devices are in position to receive the sheet. At this point the carriage pauses in its forward movement.

The stops 76 are carried by arms pivoted on a rod 139 mounted transversely of the frame 6. Secured to this rod is an arm 140 tensioned by a spring 141 so as to hold the stops 76 in raised position. Also secured to the rod 139 is an arm 142 and an arm 143. The former of these is arranged to engage a shaft 144, also mounted transversely of the frame 6. The arm 143 carries at its end a roller 145. The arm 142 acts as a stop to position the roller 145 in the path of the carriage, which has one corner thereof beveled off, as indicated at 146. (See Figure 8.)

After a short pause in the position indicated in Figure 2, as described, the carriage moves forward. Upon such further movement the bevel 146 engages the roller 145, depressing the same so as to rock the rod 139 thereby depressing the stops 76. This permits the sheet of paper which has been resting against these stops to slide rearwardly and to enter between the guides 105 and 106. This puts the sheet into position to be engaged by the fingers 109 and 119. Immediately thereafter the dog 115 strikes the arm 116 thereby releasing the fingers 109 which clamp the paper and also the finger 119 which descends upon the paper and simply rests there.

Movement of the carriage is now reversed and as it moves rearwardly it draws the sheet of paper into the machine between the platen and the chase 78. Mounted on the frame 6 near the rear of the machine is an upwardly projecting plate 147 whose forward corner is beveled off, as shown in Figure 8. This plate stands in the path of a roller 148 on the plate 112. As the rearward movement of the carriage continues, this roller rides up the bevel on the plate 147. This carries the dog 113 rearwardly until the latch 114 slips in front of it. This action rotates the shaft 108 so as to raise the fingers 109 and release the paper. Immediately upon release, the paper settles down in the stripper frame. Its rearward momentum projects it against the stops 127 so that it is centered for printing.

After printing the stripper is raised, as described, so as to free the paper from the ribbon and the carriage then moves forward to remove the sheet. The paper is then held by the stripper in a position low enough so as to pass its edge below the guide 105 and above a complementary guide 149 mounted just below the guide 105. When so engaged the paper is carried forwardly by the carriage.

In its forward movement the front edge of the paper passes under a guide plate 150 pivoted on a rod 151 for up and down movement. This guide plate is raised to the position shown in dotted lines in Figure 5 also see Fig. 5a by the upward movement of the stripper. This guide deflects the front edge of the paper downwardly between a pair of rolls 152 and 153, the former of which is driven at such a speed as to feed the paper faster than it is moved by the carriage. These rolls operate to feed the paper from the carriage and downwardly between a pair of channeled guides 154.

*Platen mechanism*

Referring now, and more particularly, to Figures 4, and 9 to 13, inclusive, the intermittent gear 7 on the shaft 4 drives a corresponding intermittent pinion 155 on a stub-shaft 156 journaled in the frame 6. This shaft carries at its outer end a beveled gear 157 engaging a similar gear 158 on a vertical shaft 159 journaled in bearings 160 on the frame 6. The shaft 159 is connected by beveled gears 161 with a train of gearing 162, 163, 164 and 165 to a transverse shaft 166. The shaft 166 is journaled in eccentric bearings 167 which in turn are journaled in bearings 168 in the frame 6. The middle portion of the shaft 166 is equipped with an eccentric 169 working in a horizontal slot 170 in the head 171 of a ram 172. The ram 172 slides in vertical guides 173 in the upper part of the frame 6 and carries at its lower end a horizontal plate 174. Mounted for adjustment as to height and level on the plate 174 is another plate 175 which has yieldingly mounted thereon a platen 176. This platen may be provided on its lower face with a make-ready pad 177 of any suitable type such, for instance, as is used in an ordinary printing press.

Secured in any suitable manner as by screws 178 to the eccentric bearings 167 of the shaft 166 is a pair of plates 179 which are equipped with arms 180. Each plate 179 has a notch 181 adapted to receive a latch bolt 182 slidable in a guide 183 and having a pin and slot connection with an arm 184 on a shaft 185 journaled in brackets 186 on the frame 6. Secured to the shaft 185 is a hand lever or arm 187 tensioned by a spring 188 so as to keep the latch bolt 182 yieldingly in the notch 181. The shaft 185 has secured to its outer end an arm 189 which is connected by a link 190 to an arm 191 on the shaft 144 which carries the upstanding arm 121. The arm 180 of each of the plates 179 is connected by a link 192 with an arm 193 on a transverse shaft 194 journaled in the frame 6. One of the arms 193 has a second arm 195 connected by a link 196 with an arm 197 on a stub-shaft 198 journaled in the frame 6 and having secured thereto another arm 199 which stands in the path of a roller 200 on the outer face of the gear 7.

In the operation of the platen each revolution of the shaft 4 causes the mutilated gear 7 to drive the gear 155 through one complete revolution. This operates through the shaft 159 and the train of gears 161, 162, 163, 164 and 165 to rotate the shaft 166 through one complete revolution. One revolution of the shaft 166 operates through the eccentric 169 to depress the ram 172 so as to bring the platen 176 down upon the sheet so as to make a printed impression thereon and to again raise the ram and the platen to the top of its stroke. This operation is carried out each time a sheet of paper is placed in printing position.

Should it happen that a sheet of paper fails to be fed by the feeder so that when the carriage moves forward to position to grasp the same by its fingers 109, the release of the arm 117, as previously described, will cause the same to drop to the full line position of Figure 7, so as to place the finger 119 in the path of the arm 121. With the parts in this position when the carriage moves rearwardly finger 119 will engage the arm 121, drawing the same to the rear so as to rock the shaft 144. This causes the arm 191 to move downwardly drawing the link 190 downwardly thereby causing the arm 189 to rock the shaft 185 against the tension of the spring 188. This swings the arms 184 downwardly and draws the latch bolts 182 out of their notches 181. As seen in Figure 9, the link 196 is tensioned upwardly by a spring 201. This acts through the shaft 194 and the link 192 to tension the plates 179 for rotation of the bearings 167. As soon as the latch bolts 182 are withdrawn from their notches 181, the bearings 167 will be rotated in a counter-clockwise direction, as seen in Figure 13. As the normal position of these bearings is such as to place the shaft 166 in its lowermost position, such rotation will cause a slight elevation of said shaft. Such elevation is slight enough so that the gear 165 remains enmeshed with the gear 164. Such elevation is great enough, however, to prevent the platen from moving downwardly a sufficient distance to contact with the ink ribbon or the type in the chase. Accordingly, if there is no sheet of paper in printing position, this mechanism prevents making a printed impression of the type on the pad 177.

After the ram has completed its return stroke, the roller 200 on the gear 7 engages the arm 199 so as to elevate the same. This operates through the links 196 and 192 to rotate the eccentric bearings back to their normal position, whereupon the latch bolts 182 will snap back into their notches under the tension of the spring 188. It is clear, of course, that whenever a sheet of paper is properly fed, the sheet itself will hold the finger 119 in the dotted line position of Figure 7 and thereby prevent engagement of said finger with the arm 121.

*Name plate feeding mechanism*

A form of address plate which may be used in this machine is shown in Figure 35. This may be a metal plate 466 which may be provided with marginal portion 467 formed for engagement with the holding clips of the holder 210. This plate has arranged thereon in any suitable manner, type matter forming the address E. Spaced from the matter E by a suitable gap 468 is placed the salutation F. The space 468 is provided in order to separate the salutation from the address in order to provide for printing the address alone on the envelope as is more fully described in another part of this specification.

In Figure 36 is shown a diagram giving the ordinary arrangement of a circular letter such as may be handled in this machine. The letter head D comprises the ordinary heading and may also include such other permanent printing matter as may be used on the stationery. The positioning of the address plate when printing the letter is such as to place the address E and the salutation F in the positions shown relatively to the body of the letter G. Such positioning may, of course, be varied to suit the ideas of the advertiser. That shown in the figure is the customary arrangement. The signature H is usually placed at the end of the letter as indicated in Figure 36. These separate features of the letter are printed on the sheet as described in the various parts of the specification.

Referring more particularly to Figures 1, 14 to 17, inclusive, and 26 and 27, the frame 6 is provided with lateral extensions 202 and 203 to the left and right respectively. The former is provided with a vertical chute 204 adapted to receive a stack of address plates 205. These plates bear the names and addresses including in the mailing list to which letters are to be sent, together with a suitable salutation for the letter itself. A belt 206 runs on pulleys 207 and 208. The belt 206 may be of metal or other suitable material and is preferably provided along its edges with perforations 209 adapted to engage corresponding pins on the pulley 208, so as to insure accurate timing of the movement of the belt and accurate location of the address plates carried thereby. The belt is provided at properly adjusted intervals therealong with sockets or holders indicated generally at 210 adapted to receive and hold an address plate so as to carry it to its various printing positions. The belt 206 travels along the frames 202 and 203 and transversely of the movement of the carriage. Its upper flight passes between the chase 78 and the ink ribbon when such is used. It passes over the elevated portion 79 of the chase which provides a support therefor during the printing operation.

The holder 210 is of special construction in order that it may be flexible to pass around the pulleys and also capable of giving adequate support to the address plate when printing. Accordingly, the holder is constructed of a series of narrow plates 450 (Fig. 16) laid transversely of the belt 206 and secured thereto. When the belt is straight these sections lie close together to form a substantially continuous bed adapted to support the address plate, and being itself supported by the chase 78 or by the top plate 305 of the frame 203 during the printing operations. When the belt passes around a pulley these sections separate at their upper faces and permit the belt to flex. The two end sections carry spring clips 226 which hold the address plate in place on the holder.

The mechanism for feeding an address plate from the chute 204 to the belt 206 is illustrated in Figures 15 to 19, inclusive. This mechanism comprises a slide 211 arranged to slide on rails 212 below the top plate 213 of the transverse frame 202. This slide is connected through a link 214 with an arm 215 fixed to a shaft 216 running along the frame 202 and across the frame 6. This shaft carries an arm 217 connected by a link 218 with a lever 219 pivoted at 220 on the frame 6 and carries a cam roll 221 which works in the cam slot 14 in the disc 13. Rotation of the disc 13, therefore, operates to reciprocate the slide 211.

The slide 211 has pivoted thereto at 222 a pair of dogs 223 whose upper ends project through slots 224 in the top plate 213. The dogs 223 are tensioned by springs 225 to retain them in upright position.

The slide 211 is arranged to move transversely of the chute 204 and the belt 206 and the dogs 223 are arranged to project above the top plate a sufficient distance to engage the lowermost address plate in the chute 204 so as to slide the same from under the rest of the stack and into the holder 210. Said holder is provided with spring clips 226 adapted to securely retain each address plate in the holder. On the return stroke of the dogs 223 they are turned on their pivots 222 so as to be depressed by engagement with the address plates still in the shute, and said plates ride over the dogs during such return stroke. The cam slot 14 is so formed as to operate the dogs 223 in proper timed relation with the movement of the belt.

The belt 206 is caused to move by mechanism which will be described presently, immediately after the stripper has lifted the sheet. The movement continues until the address plate just printed with the letter has been moved to position for printing an envelope and the succeeding address plate has been moved into proper position for printing with the letter. At the end of such movement the belt is again arrested and locked in this position. The driving and locking mechanism are illustrated in Figures 26 and 27.

As previously stated, the plates 15 and 16 on the main drive shaft 4 provide a Geneva gear. The plate 15 has a circular outer edge throughout the greater part of its circumference adapted to engage a correspondingly curved concave edge of a star wheel 227. The edge of the disc 15 has a depression 228 adapted to receive the points of the star wheel 227 during rotation of the latter. This star wheel 227 is fixed to a shaft 229 journaled in the frame 6 and a bracket 230 mounted on said frame. The shaft 229 also carries a second star wheel 231 whose four arms are positioned to be engaged by a pin 232 on the outer face of the disc 16. The two discs 15 and 16 in co-operation with the two star wheels 227 and 231 constitute a Geneva gear adapted to rotate the shaft 229 through one-fourth of a revolution for each revolution of the shaft 4. The shaft 229 also carries a pinion which drives a train of gears 234, 235, 236 and 237 to drive a shaft 238 journaled in suitable brackets on the frame 203. The shaft 238 is connected by beveled gears 239 so as to drive a shaft 240 also journaled in suitable brackets in the frame 203 and carrying the pulley 208 which drives the belt 206. The train of gearing just described is so adjusted that each one-fourth of a revolution of the shaft 229 causes movement of the belt 206 such as to move an address plate from one of its positions to the next.

In order to insure correct registry of the address plate with the body of the letter the belt 206 must be accurately positioned at each printing point. In order to accomplish this the pulley 208 is provided with perforations 241 in its web and slidably mounted in a bracket 242 on the frame 203 is the centering pin 243 which has its rear tip tapered so as to enter the perforation 241. In order to insert this locking pin, however without jar to the apparatus, it is necessary first to bring the pulley 208 to a definite stop with the perforation 241 in registry with said pin. For this purpose the pin 243 has slidably mounted thereon a sleeve 244 which is yieldingly pressed against the web of the pulley 208 when the pin is in its rearward position by a spring 245. There is a pin and slot connection between the pin 243 and the sleeve 244 so that the sleeve may be retracted when the pin is retracted. The web of the pulley 208 has secured thereto stops 246 adapted to engage the sleeve 244 when the latter is positioned in the path of said stops. This serves to arrest the pulley 208 in position for insertion of the pin 243 in the perforation 241. In order to prevent rebound of the pulley when the stop strikes the sleeve the rim of the pulley has mounted thereon stops 247 adapted to be engaged by a latch 248 pivoted on a pin 249 on a bracket 242 and tensioned by a spring 250. The approaching edges of the stop 247 and the latch 248 are beveled relatively to one another so that the latch will ride over the stop and drop therebehind as indicated in Figure 27 when the pulley has reached the proper position.

The pin 243 is advanced and retracted by a lever 251 having a pin and slot connection with the pin 243 at 252. Said lever is fixed to a shaft 253 journaled in the frame 6 and the bracket 242 which has secured to its inner end an arm 254 connected by a link 255 to an arm 256 pivoted on a post 257 on the frame 6. The arm 256 carries a cam roll 258 co-operating with a cam slot 259 in the disc 18.

It will be seen that in the operation of this mechanism the cam 259 acts through the connections described to slide the pin 243 back and forth in the bracket 242. As the pulley 208 approaches its position of rest the pin 243 is moved rearwardly a sufficient distance to bring the end of the sleeve 244 into engagement with the web of the pulley. The pin itself is at this time held in a position with its tip clear of the pulley web. As the stop 246 comes into engagement with the sleeve 244 the pulley is arrested and immediately the latch 248 snaps in behind the stop 247 so as to prevent a rebound. The pulley is now positively held against movement in either direction. The cam 259 now moves the pin 243 so as to insert its tapered end in the perforation 241. This movement positively centers the pulley and therefore the belt 206 and locks the same in its centered position. This fixes the address plates accurately in their printing positions. The cam 259 operates to withdraw the pin 243 from the pulley in time to permit rotation thereof at the next operation of the Geneva gear.

*Envelope feeding mechanism*

As seen in Figure 14, each address plate has two printing positions. The first position "A" is over the chase 78, so as to print with the body of the letter. The second position is marked "B" in Figure 14, and in this position the plate is used to print the address on an envelope.

Referring now especially to Figures 14, 23, 24 and 25, mounted on the forward part of the frame 203 is a chute 260 adapted to contain a stack of envelopes 261. The rearward edge of the bottom envelope in the stack rests upon a friction roll 262 of rubber or other suitable material having sufficient friction to feed an envelope from the bottom of the stack.

The shaft of the roll 262 carries a mutilated gear 263 cooperating with another mutilated gear 264 on a shaft 265 journaled in the bracket 267. The shaft 265 carries a sprocket 266 connected by a chain 276 through suitable reduction gearing 277 (see Figure 1), to the sprocket 17 on the main shaft 4, as shown in Figure 4. The shaft 265 also carries a gear 278 to which is geared a pair of feed rolls 279. The lower part of the chute 260 terminates in a bottom guide 280 perforated to permit the roll 262 to project therethrough, said guide extending toward the feed rolls 279. The rearward wall of the chute terminates in a top guide 281 which approaches the guide 280 near the feed rolls. The action of the roll 262 is to feed an envelope from the bottom of the stack between the guides 280 and 281 to the rolls 279. Journaled in a suitable bracket 267 on the frame 203 is a shaft 268 which carries a pair of pulleys 269. Similarly mounted in a bracket 270 on the rear of the frame 203 is a shaft 271 carrying a pair of pulleys 272 in alinement with the pulleys 269. A pair of belts 273 runs between the pairs of pulleys 269 and 272, as seen in Figures 23 and 25. These belts are provided with perforations 274 adapted for co-operation with pins on the pulley 272 so that the movement of the belts may be accurately timed. At spaced intervals along the belts 273 and in alinement with each other on the two belts are pairs of spring clips 275.

The shaft 271 carries a sprocket 282 driven by a chain 283 from a sprocket 284 on the shaft 238. As previously described, the shaft 238 is given an intermittent rotation and the gear ratio between the sprockets 282 and 284 is such as to give the belts 273 an intermittent movement equal to the distance between the pairs of clips 275.

In the operation of this portion of the mechanism, the roll 262 feeds an envelope from the bottom of the stack at predetermined intervals in accordance with the action of the intermittent gears 263 and 264. This envelope is fed to the rolls 279 which run continuously. The rolls 279 pass the envelope under the guide plate 285 which forces it downwardly against the belts 273. The belts are so timed that the envelope comes into engagement therewith just in front of a pair of clips 275. As the feed rolls move the envelope faster than the belts their action is to force the rearward edge of the envelope under a pair of clips to be held thereby. As the belt moves it carries the envelope with it held in the clips 275.

The belts 273 pass over the belt 206. A suitable separating plate 286 being interposed therebetween so as to prevent interference, said plate being perforated at the station "B", so as to expose the address plate. The belts 273 carry the envelope to the station "B" at which point both the address plate and the envelope are stopped and held stationary during the printing operation which will be described hereinafter. After printing, the envelope is carried rearwardly by subsequent movement of the belts and finally passes over the rear pulleys 272. At the rear of the machine the belts pass through notches in the upper edge of a stripper plate 287, said notches terminating at 288. At this point the envelope is arrested as the belt moves and the envelope is stripped from the clips 275 and deposited in a suitable container 289.

*Envelope printing mechanism*

Referring to Figures 1, 12, 14, and 20 to 22 inclusive, adjacent the station "B" a bracket 290 is mounted on the frame 203. This bracket has journaled therein a shaft 291 connected by gears 292, 293 and 164, so as to be driven in timed relation with the shaft 166 which operates the main printing ram. The shaft 291 is equipped with a crank 294 connected by a link 295 with a ram 296 carrying a small printing platen 297. The make-ready pad 298 on the paten 297 is reduced in size so as to cover only the address and name on the address plate in order not to print the salutation which is also contained on said plate.

The shaft 291 is so timed relatively to the shaft 166 that the platen 297 is operated in unison with the main platen 176. Accordingly, printing operations are carried out simultaneously at stations "A" and "B".

*Address plate discharging mechanism*

Referring now to Figures 14, and 26 to 30, inclusive, after each printing operation the address plate is moved by the belt 206 from the station "B" to station "C", as indicated in Figure 14. At this station the address plate is removed from the belt and deposited in a suitable storage receiver.

As shown in Figure 14, the shaft 216 extends across the frame 6 and is connected by gears 299 with a shaft 300 journaled in the frame 203. As shown in Figure 26, the shaft 300 carries an arm 301 connected by a link 302 to a slide 303 mounted to slide in the guides 304 on the top plate 305 of the frame 203; the plate 305 being slotted to permit movement of the connection of the link 302 to the slide. The slide 303 is equipped at its rear end with a head adapted to engage an address plate in the holder 210 when the same comes to rest at the station "C". The intermittent rocking of the shaft 216, as previously described, operates through the gears 299 to rock the shaft 300 in the opposite direction. This causes the arm 301 to move the slide 303 rearwardly. This action causes said slide to push the address plate out of the holder 210 and onto an inclined guide 306 positioned in rear of the belt 206 at the station "C".

The frame 203 is provided at its rear with horizontal guides or rails 307 and 308. Mounted for lateral movement in these guides is a vertically extending carrier 309. This carrier is mounted on rollers 310 which operate in the guides 307 and 308. Mounted to slide vertically in the carrier 309 is a pair of receivers 311. These are each equipped with a ratchet bar 312 running vertically therealong adapted to be engaged by one or the other of a pair of pawls 313 pivoted at 314 on the carrier 309 and spring tensioned as shown in Figure 26. Receivers 311 are arranged so that one or the other may be positioned opposite the guide 306 so that when an address plate is transferred to said guide it will slide therefrom into the receiver. These receivers are open at their front faces but in their downward movement in the carrer 309 they pass behind a vertical plate 315 which serves to close the front of the receiver and retain the plates therein.

The pawls 313 have their upper tips spaced apart vertically one-half the distance between the teeth of the ratchet 312, so that when one of these pawls is in engagement with a ratchet tooth, the other stands between two teeth. The tails of these pawls stand in the path of pins 316 and 317 on a cross arm 318 carried by the shaft 238. One of these pins is shorter than the other so that it will engage the tail of only one of the pawls 313 and said tail is depressed relatively to that of the other pawl, as shown in Figure 26. This construction is such, therefore, that one of these pins will operate one of the pawls while the other operates the other pawl. The purpose of this is that at each half revolution of the shaft 238 one of these pawls will be released so as to permit the receiver 311 to move downwardly a half notch of the ratchet to engagement with the other pawl. In this way the receiver is fed downwardly step-by-step a distance corresponding to the thickness of the address plates.

In order to position the carrier 309 with one or the other of the receivers 311 in alinement with the guide 306, the mechanism shown more clearly in Figure 28 is provided. Pivoted at 319 on the carrier 309 are two levers extending in opposite directions from said pivot each equipped at one end with a hook 320 and pivoted at its other end at 321 to a trip bar 322 having a slot sliding on a pin or screw 323. Pivoted on a stub-shaft 324 on the frame 203 is an arm 325 having a slot 326 engaging a pin 327 on the carrier 309. Secured to the same shaft 324 is a double arm lever 328. Loosely pivoted on the shaft 324 is an arm 329 provided with a handle 330 and tensioned by a spring 331 the opposite end of which is secured to the frame 203. The handle 330 is provided with a pin extending through a perforation in the arm 329 and spring connected to said arm so that by drawing back on the handle the pin may be withdrawn. This pin is adapted to be set into a perforation 332 on either arm of the two armed lever 328. When the handle is thus engaged with the upper arm of said lever, as shown in Figure 28, the spring 331 tensions said lever in such a manner as to tend to move the carrier 309 to the left (Figure 28) through the action of the arm 325. The carrier is held against such movement by the engagement of the corresponding hook 320 with the end of a stop plate 333 mounted on the frame 203. In this position the left-hand receiver 311 is alined with the guide 306. The rear wall of the receiver is provided with a vertical guideway 334 in which a stop 335 may be positioned at any desired point thereof by means of a thumb screw or the like. This stop is adapted upon downward movement of the receiver 311 to come into engagement with the upper end of the release bar 322, which upper end projects into the guideway 334. As the receiver moves downward the stop 335 depresses the bar 322 thereby rocking its lever on the pivot 319 so as to raise the hook 320 and release the carrier. When so released the carrier moves to the left (Figure 28) under the influence of the arm 325 so that the other receiver 311 comes into alinement with the guide 306. A suitable stop 464 limits the travel of the carrier in each direction so as to accomplish such alinement. The locking levers are tensioned by springs 336 so as to automatically snap into engagement with the locking plate 333 at the other end of their travel. This mechanism provides that the receiver may be shifted after a predetermined number of plates have been deposited therein. The device is reset for movement in the opposite direction by disengaging the handle 330 from one of the arms of the lever 328 and reengaging it with the other.

In Figures 29 and 30 a modified construction is shown adapted for use with a different type of address plate which is inserted in the holder on the belt and removed therefrom in an endwise direction longitudinally of the belt. In these figures a guide 506 corresponds with the guide 306 of Figure 26. This guide may also act as a stripper to remove the address plate from the belt. In this embodiment the receivers 311 are placed opposite the end of the belt, as shown in Figure 29, and would be at the extreme right-hand end of the frame 203, as shown in Figure 14. The shifting movement of the carrier in this case is toward the front and rear of the machine rather than lateral as in Figure 26. In Figure 29 the pawls 513 correspond with the pawls 313. (Figure 26). In this case, however, their tails extend in the path of pins 516 mounted on the pulley 208. The remaining mechanism illustrated is the same as has been previously described.

Ribbon mechanism

Figure 32:
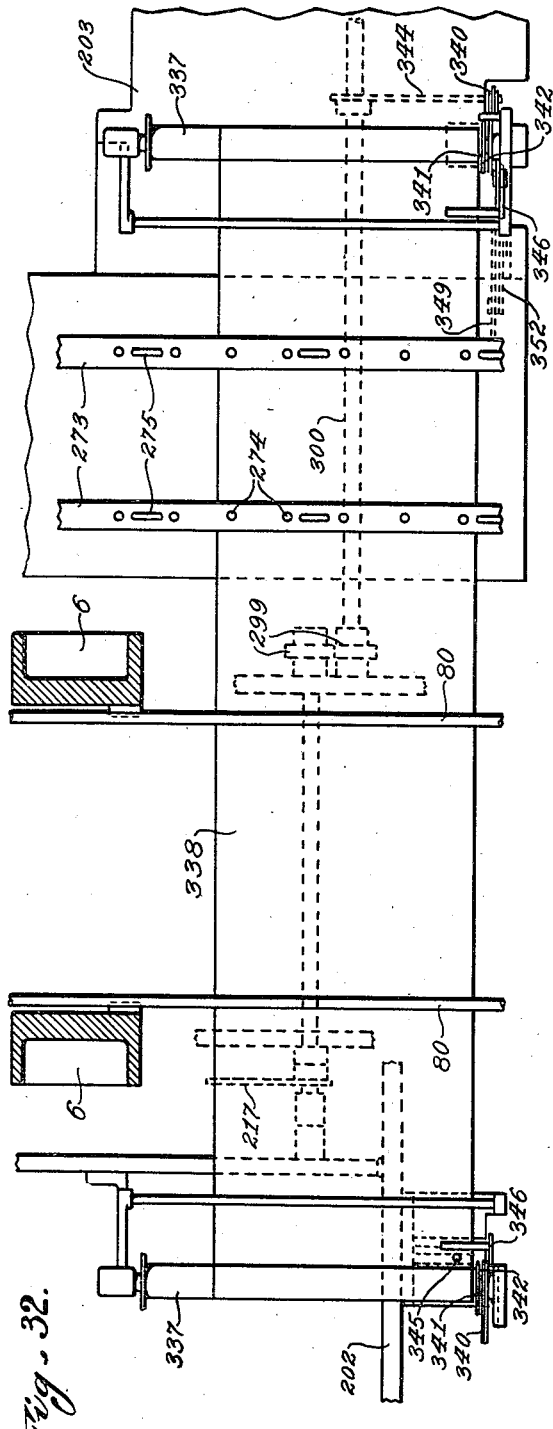
Figure 32 is a plan view of Figure 31.
Figure 31:
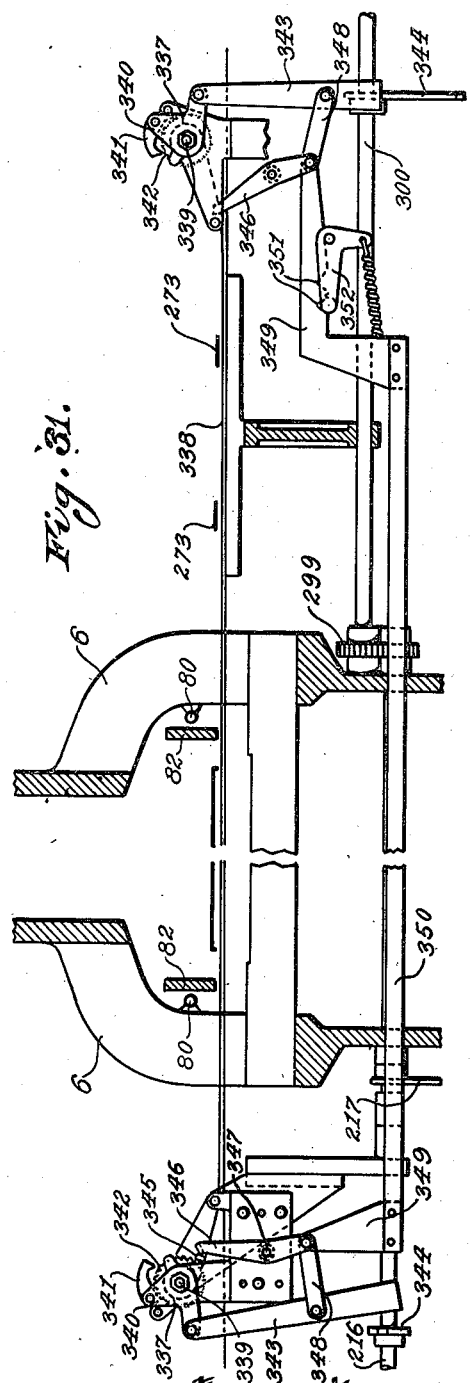
Figure 31 is a detail sectional view taken about on line 31—31 of Figure 14 showing the mechanism for winding and rewinding the ink ribbon.

Ribbon mechanism is illustrated in Figures 31 and 32. Mounted on a suitable bracket on each of the side frames 202 and 203 is a roll 337 upon which the ink ribbon 338 may be wound up. As the mechanisms for winding and rewinding the ribbon are duplicated at opposite ends of the frame, only one of these will be described. Pivoted on the shaft 339 of the roll 337 is a bell crank 340 to one arm of which is pivoted a pawl 341 adapted to co-operate with a ratchet wheel 342 fixed to the roll 337. The other arm of the bell crank is connected to a downwardly extending link 343. In the position shown at the right-hand side of Figure 31, the lower end of the link 343 stands in the path of an arm 344 on the shaft 300. As this shaft is rocked, as previously described, the arm 344 lifts the link 343 thereby swinging the bell crank 340 on its pivot which causes the pawl 341 engaging the ratchet wheel 342 to turn the roll 337 through a predetermined angle so as to wind up a short length of the ribbon 338. As the shaft 300 is rocked at each printing operation, the ribbon is thus advanced in small steps during the operation of the machine.

In order to reverse the movement of the ribbon automatically before it has been all paid out from either roll, the ribbon is provided near each end with a button or enlargement 345 adapted to engage the end of a lever 346. The end of the lever 346 may be turned over and forked so that the prongs of the fork may be positioned above and below the ribbon in order to insure positive engagement of the button with the lever. The lever 346 is pivoted at 347 on a suitable bracket on the cross frame and is connected at its lower end by a link 348 with the lower end of the arm 343. The left-hand end of Figure 31 shows the position of these parts just before the button on the ribbon goes into engagement with the lever 346. The lower end of the arm 346 is also connected by a bracket 349 to a longitudinally shiftable link 350 extending across the frame 6 to the other end of the machine and similarly connected to the corresponding lever at the other end of the ribbon.

As the ribbon is fed step-by-step to the right in Figure 31, the button 345 moves the upper end of the lever 346 to the right thereby swinging the lower end of the arm 343 (left-hand end Figure 31), to the left into the path of the arm 344 which at this end of the machine is mounted on the shaft 216. The same movement of the lever 346 shifts the link 350 to the left thereby swinging the lever 343 at the right-hand end of the ribbon to the left and out of the path of the arm 344 at this end. This sets the left-hand mechanism for winding the ribbon and the right-hand mechanism for unwinding the ribbon. Each end of the ribbon is equipped with a button 345 so that the reversal of movement of the ribbon is accomplished automatically at each end thereof. The bracket 349 at the right-hand side of the machine is provided with a pair of notches 351 adapted for engagement by a spring detent 352. This is simply to lock the mechanism in each of the adjusted positions until positively moved by the mechanism itself.

*Letterhead and signature printing mechanism*

This mechanism is illustrated in Figures 1, 5 and 33 and 34. As previously described, the sheet having had printed thereon the body of the letter and the name and address is delivered to the rolls 152 and 153 and by them transferred to the guides 154. The roll 152 carries a pinion 353 engaging a gear 354 suitably mounted for rotation on the frame 6 and connected by beveled gearing 355 to drive an inclined shaft 356. The latter shaft is connected through beveled gearing 357 with a gear 358 on a shaft 359 journaled in a suitable bracket on the frame 6. The gear 358 is driven by a large gear 360 mounted on the disc 10 on the main shaft 4, as may be seen from Figure 4. This train of gearing drives the roll 152 continuously.

Mounted on a shaft 361 suitably journaled in the frame 6 is a printing cylinder 362. Loosely mounted on the shaft 361 is a sleeve 363 which carries a pinion 364. The pinion 364 meshes with a toothed-sector 365 pivoted at 366 on the frame 6 and connected by a link 367 with a lever 368 pivoted on the shaft 92 in the frame 6. The lever 368 carries a cam roll 369 co-operating with the cam groove 12 in the disc 10. The operation of the cam 12 swings the lever 368 forward and back on its pivot which acts through the link 367 to rock the sector 365 on its pivot 366. This movement rotates the pinion 364 and its attached sleeve 363 back and forth through one revolution. The sleeve 363 also carries a disc 370 which has mounted on the outside face thereof a spring pawl 371 adapted to engage a one tooth ratchet 372 fixed to the shaft 361. By means of this ratchet and pawl connection the back and forth rotation of the sleeve 363 operates to turn the shaft 361 and, therefore, the printing cylinder 362 through successive complete revolutions. A disc 373 fixed to the shaft 361 has a notch engaged by a spring detent 374 so as to secure the cylinder in a definite position between rotations.

Pivoted at 375 on a bracket 376 on each side member of the frame 6 is an arm 377 provided at its end with a bearing 378. The angular position of the arm 377 is adjustable by means of screws 379 threaded in the bracket 376. Journaled in the bearings 378 is a pressure roll 380 adapted to engage the printing cylinder 362 and geared thereto so as to rotate therewith. The roll 380 has a slot 381 therealong in which may be seated a locking strip 382. This provides for applying to the roll 380 a make-ready pad 383 which is secured by means of the strip 382. The latter strip may be provided with an outstanding flange 384 adapted to provide a stop to be engaged by the paper passing down the guides 154. As previously described, the paper sheet with the letter printed thereon passes down the guides 154 which directs it between the printing cylinder and the roll. At the next operation of the cylinder the sheet is caught between the two during their rotation and is fed onward thereby and during its passage has printed thereon each in its proper position on the sheet the letterhead and the signature. Having passed the printing cylinder, the completely printed sheet may be deposited in any suitable receptacle, not shown in the drawings.

INKING DEVICES

*Signature inker*

The device for inking the signature plate on the printing cylinder is shown in Figures 5 and 33.

Pivoted on a shaft 385 mounted in the frame 6 is a frame 386 which has a downwardly extending arm 387 tensioned by a spring 388 whose other end is secured to the frame 6. The frame 386 has mounted for rotation therein an ink roller 389. This roller is constructed so as to hold a sufficient quantity of ink for printing a considerable number of letters. A practical way of constructing this roller is to make it of felt which is then saturated with the ink to be used for printing the signature. Mounted in a pair of arms 390 pivoted at 391 in the frame 386 is a transfer roller 392 which may be of the composition ordinarily used for printing press ink rollers or of any other suitable material. The arms 390 are tensioned by springs 393 (these parts being duplicated at both ends of the frame), so as to maintain the roller 392 yieldingly in contact with the ink roller 389. A second transfer roller 394, which may also be of composition, is mounted in a pair of arms 395 pivoted on a shaft 396 journald in the frame 386 and tensioned by springs 397. The roller 394 is provided with a cam roller 398 of steel or other suitable material adapted to engage a cam 399, mounted at the left-hand end (Fig. 34) of the shaft 361 of the printing cylinder 362. The springs 397 maintain the roller 398 in contact with the cam 399.

In the operation of this inker the ink is transferred from the roll 389 to the roll 392 and thereby to the roll 394. The latter roll is maintained out of engagement with the printing cylinder by the cam 399 until during the rotation of the cylinder for printing, the signature plate is about to come opposite said roll. The cam 399 is provided with a depressed portion 400 which when the roller 398 passes over that portion operates to let the roller 394 down upon the signature plate so as to ink the same. The extent of the depressed portion 400 is just sufficient to ink the signature plate after which the ink roll is again lifted therefrom. When the cam lets the roller 394 down upon the type the entire frame 386 pivots on the shaft 385 so as to follow the roll through a portion of its movement. Before the roll touches the type, however, the arm 387 engages a stop 401 on the frame 6 which arrests the movement of the frame 386. This does not, however, arrest the movement of the roller 394 which then pivots at 396 and under the influence of the springs 397 moves into engagement with the type. It will be seen, therefore, that the roll 394 moves away from the roll 392 during the time of inking. This permits the former roll to rotate at such a rate as to maintain a firm contact with the type plate and without any drag imposed upon it by the roll 392. At the same time during that portion of the movement when the roll 398 is rolling on the cam 399 the spring 388 maintains the roll 392 in yielding contact with the roll 394 which latter roll causes the others to rotate in order to spread the ink thereover.

*Letterhead inker*

As it may be desirable under certain circumstances to provide a roller inking device for printing the body of the letter instead of using the ink ribbon, provision is made for such an inking device on this machine. As the circumstances under which such an inking device is used frequently render it unnecessary to print a corresponding set of envelopes, a corresponding inking device for printing envelopes is not shown in the drawings. When used in this way, therefore, the machine prints letters only.

Referring to Figures 1, 5, 33 and 34, mounted on a bracket 402 on the frame 6 is an ink fountain 403 similar to the ink fountain 97 described in connection with the inking of the type in the chase 78. The ink roll 404 of this fountain has mounted on its shaft a ratchet 405 engageable by a movable pawl 406 operated by a link 407 connected to an arm 408 pivoted at 409 on a bracket 410 mounted in turn on the bracket 402. The arm 408 carries a roller 411 engaging a cam 412 on a shaft 413 journaled in the bracket 410. The shaft 413 is connected by gears 414, 415, 416 and 417 to be driven by the shaft 359. (See Figure 5). The shaft 413 is also geared to the shaft 418 journaled in the bracket 410 and carrying an ink roll 419. The roll 419 is preferably of composition or similar yielding material. A steel ink roll 420 is mounted on a shaft 421 loosely journaled in bearings 422 on brackets 423 adjustable on the bracket 410 so as to position the roll 420 for contact with the roll 419. Mounted on a shaft 424 journaled in a pair of arms 425, fixed to a shaft 426 journaled in the bracket 410 is an ink roll 427. This roll may be of composition. Fixed to the shaft 426 is an arm 428 connected by a link 429 to the arm 408. The arm 428 is adjustable by means of the screw 430 relatively to the arms 425 so as to adjust the contact of the roll 427 with the roll 420.

As the shaft 413 is driven in rotation, the cam 412 engaging the roll 411 which is maintained in contact therewith by a spring 431, causes the arm 408 to swing back and forth on its pivot 499 thereby moving the links 407 and 429. The former link operates the pawl 406 to intermittently engage the ratchet 405 so as to feed ink from the fountain 403. The latter link swings the arm 428 so as to rock the shaft 426 thereby swinging the roll 427 alternately to contact with the rolls 404 and 420. This causes the roll 427 to take ink from the roll 404 and transfer the same to the roll 420. The latter roll in turn transfers the ink to the roll 419.

In order to insure spreading the ink uniformly over these rolls, the shaft 421 is equipped at its outer end with a grooved collar 432 engaging a pin or roll 433 on an arm 434 pivoted at 435 on the bracket 410 and carrying at its upper end a pair of spaced pins or rolls 436. Mounted on the shaft 413 is a disc 437 which is set at an angle upon said shaft as illustrated in Figure 34. This disc has its edge located between the pins 436 so that when the disc rotates it engages these pins to rock the arm 434 back and forth on its pivot. This arm through the agency of the pin 433 and the collar 432 shifts the shaft 421 endwise in its bearings so that the roll 420 as it rotates in contact with the other rolls mentioned shifts endwise thereof and distributes the ink uniformly over all of the roll surfaces.

In order to transfer the ink to the letterhead printing plate on the printing cylinder, a pair of rolls 438 which may be of steel or the like are mounted in universally adjustable brackets 439 whereby they may be adjusted for contact both with the roll 419 and with a pair of movable transfer rolls 440 whose shafts are slidably mounted in an upward extension 441 of the bracket 410. These rolls are also provided with cam rolls 442 at each end adapted to engage corresponding cams 443 one of which is mounted on each end of the printing cylinder shaft 361. Springs 444 maintain the rolls 442 in engagement with the cams. These cams are also provided with depressed portions 445 so positioned as to cause the rolls 440 to move into engagement with the printing plate on the cylinder for printing the letterhead. As the rolls 440 move into engagement with the type they move out of engagement with the rolls 438 so as to be free to rotate in response to their contact with the type plate. All of these rolls are geared together so as to insure proper rotation with respect to each other by means of gears 446, 447, 448 and 449.

Résumé of operations

The operation of this machine is as follows:
The motor 1 drives the main shaft 4 through the sprocket 3. The shaft 4 provides the primary source of power for carrying out all the operations of the machine.

The sheet is slid down between the guides 73 and 74 and is stopped by the stops 76 (Figs. 2 and 5) in position to be picked up by the carriage. The carriage 82 operated as described by the sector 88 from the cam 11 moves forward to a position just short of its position for grasping the paper sheet. The cam 11 controls this pause so as to break the momentum of the carriage and bring it gently to its final position. After this pause the carriage moves forward farther, whereupon its forward edge strikes the roll 145 so as to depress the stops 76 thereby releasing the sheet which slides back, entering between the guides 105 and 106 and under the fingers 109. At this point the dog 115 engages the arm 116 thereby releasing the shaft 108 which turns under the influence of the spring 118 and brings the gripping fingers 109 down upon the sheet to clamp the same against the guides 105. The sector 88 now moves the carriage rearwardly and draws the sheet back over the chase 78 containing the type for printing the body of the letter. Near the end of the stroke of the carriage the roll 148 comes into engagement with the plate 147 so as to release the fingers 109 and reset the same by means of a latch 114 for the next operation.

While the foregoing operations are being carried out, the cam 14 operates the slide 221 (Fig. 14) which by means of the dogs 223 pushes an address plate from the bottom of the stack 205 and inserts the same in one of the holders 210 on the belt 206. The belt is then moved in successive steps to carry the address plate in its holder to the position "A" of Figure 14 where it is located in proper relation with the body of the letter. The accuracy of this location is secured by the locating of the pulley 208 by means of the pin 243, as described in connection with Figures 26 and 27.

At the same time an envelope has been fed from the bottom of the stack 261 and by means of the rolls 279 has been engaged with the pair of fingers 275 on the belts 273. This envelope has been carried in successive steps to the station "B" of Figure 14 where it is positioned under the envelope printing platen 297.

The intermittent gear 7 now operates its train of gearing to cause the main printing platen 176 and also the envelope printing platen 297 to descend simultaneously. At this time the main platen presses the sheet located on the stripper, as previously described, into contact with the type in the chase 78 and with the address plate. This prints on the sheet the body of the letter, the name and address of the addressee and the salutation. At the station "B" the envelope has printed thereon simply the name and address. When the printing platens are again raised, the carriage 82 moves forwardly while the stripper raises the sheet from the type to a position to be engaged between the guides 105 and 149. The sheet is now moved forwardly by the carrier. At this time the guide 150 is elevated so as to deflect the sheet downwardly to rolls 151 and 152 which feed the sheet at an accelerated rate into the guides 154. The accelerated feed removes the sheet rapidly from the carriage so that the latter moves forwardly to receive a successive sheet without interference from the previous one.

At this time also the shaft 216 is again rocked by the cam 214. This not only operates to pass a new address plate from the stack 205 to the holder 204 but also operates the shaft 300 which in turn operates the slide 303 to remove the already printed address plate from the holder and transfer it to one of the receivers 311, said receiver being fed downwardly by the operation of the pawls 313, as previously described. After the printing of each envelope the same is carried rearwardly by the belts 273 and deposited in the container 289 where the printed envelopes are accumulated in the order of their printing.

The operation of the shafts 216 and 300 with each printing of a sheet operates the pawls 341, shown in Figure 31, to feed the ink ribbon 338 step-by-step across the machine. This ribbon passes over the chase carrying the body of the letter and its associated address plate and then over the address plate at the station "B" so as to be in position to make its impression upon the sheet or the envelope when these are printed by action of their respective platens. When the ribbon has been fed in one direction its full length, the button 345 shifts the lever 346 which operates, as described, to reverse the feed of the ribbon.

As previously pointed out, in case a sheet should fail to be fed down the slide 73 to position to be gripped by the fingers 109, the release of said fingers will cause the finger 119, which is now unsupported by a paper sheet, to the full line position of Figure 7. When the carriage now moves rearwardly with the finger 119 in this position said finger engages the arm 121 to move the same rearwardly. This operates through the link 190 to withdraw the latch bolts 182 from their notches in the plates 179. Said plates being tensioned for rotation, as previously described, thereupon turn in a counter-clockwise direction as seen in Figure 13. This turns the eccentric bearings 167 through a short arc so as to slightly raise the shaft 166 without disengaging the gear 165 from the gear 164. This elevation of the shaft is sufficient to prevent the platen 176 from descending far enough to contact with the type. As this operation of the machine is completed, the roller 200 on the disc 7 operates, as described, to reset the bearings 167 and to latch the same by means of the bolts 182.

The sheet having the body of the letter and the address printed thereon when delivered to the guides 154, as described, passes downwardly between the printing cylinder 362 and its pressure roll 380. The printing cylinder has mounted thereon separate plates bearing the signature and the letterhead. These are inked by separate inking devices which may apply inks of different colors. The ink for the signature is supplied from the roll 389 through the rolls 392 and 394. The latter roll is controlled by the cam 399 so as to contact only with the signature plate, as previously described.

The device for inking the letterhead plate takes ink from the fountain 403. As the letterhead is usually printed in black or with heavier type, the regular printer's ink is usually used in the fountain 403. This is a relatively heavy ink and must be carefully spread on the rolls to insure uniformity. As previously described, the roll 427 makes intermittent contact with the rolls 404 and 429 so as to transfer ink in small quantities from the former to the latter. The roll 420 transfers the ink to the roll 419 and is so operated as to have an endwise shifting movement, as described, in order to thoroughly spread the ink over all the rolls. From the roll 419 the ink is transferred by the rolls 438 to the rolls 440 which latter rolls transfer it to the letterhead plate under the control of the cams 443. In the inking of either the signature plate or the letterhead plate, the inking rolls contacting therewith are free of contact of the other rolls, so that they may be rotated by their contact with the type. This avoids any tendency for the rolls to drag across the type. After passing the printing cylinder the completely printed sheet may be delivered to any suitable receptacle. The sheets are delivered from the machine in the same order as the envelopes so that when ready for sealing and mailing the two stacks, one of printed letters and the other of addressed envelopes, are arranged so that the names of the addressees come in the same order. This avoids all necessity for sorting and enables the sealing operation to be carried out rapidly and with little chance for error.

*Conclusion*

It will be seen that this invention provides a machine which is capable of printing a series of circular letters each addressed to an individual addressee together with a series of envelopes addressed so as to correspond with the letters. It will be noted that each letter bears a salutation which is addressed to the particular addressee by his own name. This, of course, lends a personal touch to the letter which is not obtainable with such printing machines which vary the salutation only to make it singular or plural. While the salutation is carried on the address plate, it will be noted that it is not printed on the envelope. Accordingly, the circular letter as far as its address and salutation are concerned is in substantially the same form as if it were written on the typewriter as a personal letter.

The same effect is carried out in the printing of the letter head and the signature. The letter head may be printed in the regular printer's ink in black or other suitable color while the body of the letter being printed from an ink ribbon presents the identical appearance of a typewritten letter. The signature having its own inking device may be printed in an ink simulating that used in signing the letter with a pen. Accordingly, the finished letter has an appearance identical with that of an individually typewritten letter.

These features are important advantages of applicants' invention since they render the circular letter practically impossible to distinguish from an individually written personal letter. Advertising matter presented in this form, of course, is much more liable to receive attention by the recipient than is a letter which shows at a glance that it is machine printed and, therefore, obviously a circular.

The machine is arranged automatically to print all of the matter appearing thereon. This includes the letter head. Accordingly, the machine may be supplied with blank sheets of paper, it handles these sheets individually and accurately and they come out fully printed as a complete letter. This avoids the necessity of providing stationery already printed with the letter head, thereby avoiding the expense of a separate printing.

The mechanism for restraining the action of the letter printing platen in case a sheet fails to feed is such that the driving connections are not disturbed thereby and after the operation of this mechanism the machine is immediately restored to normal condition for printing.

The address plates are moved across the paths of movement of the letter sheet and the envelope and are arrested successively at the two corresponding printing positions. Accordingly, a letter sheet and its corresponding envelope pass through the machine practically together and emerge therefrom in the same order.

While this machine has been described as a complete unitary machine, it will be understood, of course, that individual features and sub-combinations thereof are useful by themselves without relation to other parts of the machine. It is further understood that the employment of such individual features and sub-combinations is contemplated by this invention and is within the scope of the appended claims. It is further obvious that various changes may be made, within the scope of the appended claims, without departing from the spirit of this invention; it is to be understood, therefore, that this invention is not limited to the specific details shown and/or described.

Having thus described the invention, what is claimed is:

1. In a letter printing machine having a printing form and an endless belt carrier for moving an address plate horizontally across said form into position for printing with said form and thereafter away from said form in the same direction; a rack for a vertical stack of address plates, and means adapted to move the bottom plate from said stack onto said carrier in a direction transverse to the movement of the latter.

2. In a letter printing machine having a printing form and an endless belt carrier for moving an address plate horizontally across said form into position for printing with said form and thereafter away from said form in the same direction; a rack for a vertical stack of address plates, a plate holder on said carrier, and means adapted to move the bottom plate from said stack into said holder in a direction transverse to the movement of said carrier.

3. In a letter printing machine having a printing form; a flexible belt carrier adapted to move an address plate into position for printing with said form, a rack for a stack of address plates, a plate holder on said carrier adapted to flex therewith in changing direction, and means adapted to move the bottom plate from said stack into said holder.

4. In a letter printing machine having a printing form; a flexible belt carrier adapted to move an address plate into position for printing with said form, a rack for a stack of address plates positioned laterally of said carrier, a plate holder on said carrier adapted to flex therewith in changing direction and open at the side adjacent said rack, and means adapted to move the bottom plate from said stack into said holder.

5. In a letter printing machine having a printing form; a carrier adapted to move an address plate into position for printing with said form, means for arresting said carrier, and a bolt-and-socket lock for locking the arrested carrier adapted to center the same with the plate in printing position.

6. In a letter printing machine having a printing form; a carrier adapted to move an address plate into position for printing with said form, means for arresting said carrier, and means for locking the arrested carrier with the plate in printing position, said arresting means being positioned by said locking means.

7. In a letter printing machine having a printing form; a carrier adapted to move an address plate into position for printing with said form, means for arresting said carrier, means adapted to prevent rebound of the arrested carrier, and means for locking the arrested carrier with the plate in printing position.

8. A letter printing machine, comprising, a letter printing platen, an envelope printing platen, a carrier adapted to receive and carry an address plate to printing positions to cooperate successively with each of said platens, automatic means for feeding individual letter sheets successively to said letter printing platen, and automatic means operating in synchronism with said sheet feeding means for feeding envelopes successively to said envelope-printing platen in correspondence with the sheets fed to said letter printing plates.

9. A printing machine, comprising, a platen, progressively moving means for feeding a series of address plates underneath said platen, means for feeding a series of blanks underneath said platen and in a line crossing said series of plates, and means for stopping and locking both said feeding means with a plate and a blank in registry underneath said platen.

10. A printing machine, comprising, a platen, a belt movable beneath said platen, a second belt crossing said first belt beneath said platen, address plate holders and blank holders on said belts respectively, means for moving said belts in timed relation with each other, and supply holders for address plates and blanks respectively cooperating with said belts and said holders thereon.

11. A machine of the character described, comprising, a belt, a supply holder for address plates having a holder open at its sides, means for feeding the plates from said supply holder crosswise onto said belt to a holder thereon, and means for removing the plates from said belt.

12. A machine of the character described, comprising, means for feeding address plates to a discharge point, a series of holders for receiving said plates, and means operating after any holder has been filled to any predetermined extent adapted to shift another holder to said discharge point.

13. A machine of the character described, comprising, means for feeding address plates to a discharge point, a series of holders for receiving said plates, means for moving said holder as the plates are received therein, and means operating upon movement of said holder after it has been filled to any predetermined extent adapted to shift another holder to said discharge point.

14. A machine of the character described, comprising, means for feeding address plates to a discharge point, a series of holders for receiving said plates, means for moving said holder as the plates are received therein, and adjustable means operating upon movement of said holder to the adjusted position adapted to shift another holder to said discharge point.

15. A machine of the character described, comprising, means for feeding address plates to a discharge point, a series of holders for receiving said plates, means for moving said holders as the plates are received therein, means for shifting said holders relative said discharge point, and an adjustable stop adapted to control said shifting means.

16. A machine of the character described, comprising, means for feeding address plates to a discharge point, a shiftable carriage at said discharge point, and a series of plate-receiving supply holders removably and interchangeably mounted on said carriage.

17. In a printing machine of the character described a flat letter printing platen, an envelope printing-platen, progressively traveling means for moving a series of address plates into registry successively with each of said platens, an ink ribbon passing over the address plates in both of said registry positions, and means for feeding sheets to said letter printing platen and for feeding envelopes to said envelope printing platen.

18. In a printing machine of the character described, a flat letter printing platen, an envelope printing-platen, progressively traveling means for moving a series of address plates into registry successively with each of said platens, an ink ribbon passing over the address plates in both of said registering positions, means for feeding sheets to said letter printing platen and for feeding envelopes to said envelope-printing platen, mechanism for feeding said ribbon and an element at each end of said ribbon adapted upon engagement with said mechanism to reverse the operation of the same.

DAVID O. ROYSTER.
EDWIN L. RELLER.

CERTIFICATE OF CORRECTION.

Patent No. 2,026,101.

December 31, 1935.

DAVID O. ROYSTER, ET AL.

It is hereby certified that error appears in the printed specification of the above numbered patent requiring correction as follows: Page 2, first column, line 4, for "showings" read showing; page 3, first column, line 38, for "and" read an; page 5, second column, line 24, for "including" read included; page 12, second column, line 55, claim 11, after "belt" and before the comma insert the words having a holder open at its side; and line 56, same claim, strike out the words "having a holder open at its sides"; and that the said Letters Patent should be read with these corrections therein that the same may conform to the record of the case in the Patent Office.

Signed and sealed this 31st day of March, A. D. 1936.

Leslie Frazer
Acting Commissioner of Patents.

(Seal)